(12) United States Patent
King et al.

(10) Patent No.: US 7,941,353 B2
(45) Date of Patent: May 10, 2011

(54) IMPACTED FINANCIAL STATEMENTS

(75) Inventors: Nigel King, San Mateo, CA (US); Wakana Masumoto, Mountain View, CA (US); Peter Heller, San Mateo, CA (US); Melanie Harp, Oakton, VA (US)

(73) Assignee: Oracle International Corporation, Redwood Shores, CA (US)

( * ) Notice: Subject to any disclaimer, the term of this patent is extended or adjusted under 35 U.S.C. 154(b) by 1240 days.

(21) Appl. No.: 10/464,055

(22) Filed: Jun. 17, 2003

(65) Prior Publication Data
US 2004/0260634 A1 Dec. 23, 2004

(51) Int. Cl.
*G06Q 40/00* (2006.01)
(52) U.S. Cl. .......................................................... 705/35
(58) Field of Classification Search ................... 705/35, 705/36 R, 37
See application file for complete search history.

(56) References Cited

U.S. PATENT DOCUMENTS

| | | | |
|---|---|---|---|
| 5,537,590 | A | 7/1996 | Amado |
| 5,611,052 | A | 3/1997 | Dykstra et al. |
| 5,701,400 | A | 12/1997 | Amado |
| 5,726,914 | A | 3/1998 | Janovski |
| 5,737,494 | A | 4/1998 | Guinta et al. |
| 5,754,857 | A | 5/1998 | Gadol |
| 5,930,762 | A | 7/1999 | Masch |
| 5,960,404 | A | 9/1999 | Chaar et al. |
| 6,044,354 | A | 3/2000 | Asplen, Jr. |
| 6,148,335 | A | 11/2000 | Haggard et al. |
| 6,151,582 | A | 11/2000 | Huang et al. |
| 6,154,753 | A | 11/2000 | McFarland |
| 6,272,472 | B1 | 8/2001 | Danneels et al. |
| 6,311,166 | B1 * | 10/2001 | Nado et al. ........................ 705/30 |
| 6,327,656 | B2 | 12/2001 | Zabetian |
| 6,336,094 | B1 * | 1/2002 | Ferguson et al. ................. 705/1 |
| 6,601,233 | B1 | 7/2003 | Underwood |
| 6,643,625 | B1 | 11/2003 | Acosta et al. |

(Continued)

FOREIGN PATENT DOCUMENTS
WO WO 2004/088561 A1 10/2004
(Continued)

OTHER PUBLICATIONS

NPL-1 : The Bond Buyer, v 339, n 31337, p 1; Mar. 5, 2002; Document Type: Newspaper ISSN: 0732-0469(US).*

(Continued)

*Primary Examiner* — Hani Kazimi
*Assistant Examiner* — Hatem Ali
(74) *Attorney, Agent, or Firm* — Townsend and Townsend and Crew LLP

(57) ABSTRACT

A system for displaying financial information includes a financial statement having a set of financial accounts, a set of business processes associated with the set of financial accounts, and an financial statement manager for displaying the financial statement and the associated set of business processes. The financial statement manager is further adapted to display the financial statement and the set of risks associated with the set of financial accounts, the financial statement and a set of risk controls associated with the set of financial accounts, and/or the financial statement and a set of sample transactions associated with the set of financial accounts. The financial statement manager is further adapted to import the financial statement, which can be encoded in XML format. The system includes a web server for displaying the financial statement and the associated set of business processes as a web page on a user's web browser.

11 Claims, 12 Drawing Sheets

U.S. PATENT DOCUMENTS

| | | |
|---|---|---|
| 6,654,788 B1 | 11/2003 | Chance et al. |
| 6,714,915 B1 | 3/2004 | Barnard et al. |
| 6,727,106 B1 | 4/2004 | Ankutse et al. |
| 6,763,353 B2 | 7/2004 | Li et al. |
| 6,850,643 B1 | 2/2005 | Smith et al. |
| 6,876,992 B1 | 4/2005 | Sullivan |
| 7,003,477 B2 | 2/2006 | Zarrow |
| 7,006,992 B1 | 2/2006 | Packwood |
| 7,069,234 B1 | 6/2006 | Cornelius et al. |
| 7,076,727 B1 | 7/2006 | Flam et al. |
| 7,113,914 B1 | 9/2006 | Spielmann et al. |
| 7,136,827 B2 | 11/2006 | Eicher |
| 7,185,010 B2 | 2/2007 | Morinville |
| 7,185,192 B1 | 2/2007 | Kahn |
| 7,188,169 B2 | 3/2007 | Buus et al. |
| 7,216,132 B1 | 5/2007 | Flam |
| 7,222,329 B2 | 5/2007 | Cole et al. |
| 7,246,137 B2 | 7/2007 | Paulus et al. |
| 7,249,074 B1 * | 7/2007 | Land et al. ............ 705/34 |
| 7,290,275 B2 | 10/2007 | Baudoin et al. |
| 7,373,310 B1 | 5/2008 | Homsi |
| 7,412,520 B2 | 8/2008 | Sun |
| 7,523,053 B2 | 4/2009 | Pudhukottai et al. |
| 7,752,070 B2 | 7/2010 | Hatcher et al. |
| 2001/0047274 A1 | 11/2001 | Borton |
| 2002/0035495 A1 | 3/2002 | Spira et al. |
| 2002/0038217 A1 | 3/2002 | Young |
| 2002/0046051 A1 | 4/2002 | Katzman et al. |
| 2002/0082891 A1 | 6/2002 | McKay et al. |
| 2002/0082895 A1 | 6/2002 | Budka et al. |
| 2002/0095322 A1 | 7/2002 | Zarefoss |
| 2002/0129221 A1 | 9/2002 | Borgia et al. |
| 2002/0138307 A1 | 9/2002 | Kramer |
| 2002/0143595 A1 | 10/2002 | Frank et al. |
| 2002/0174093 A1 | 11/2002 | Casati et al. |
| 2002/0184130 A1 | 12/2002 | Blasko |
| 2002/0188629 A1 * | 12/2002 | Burfoot ............ 707/503 |
| 2002/0188653 A1 | 12/2002 | Sun |
| 2002/0194059 A1 | 12/2002 | Blocher et al. |
| 2002/0194942 A1 | 12/2002 | Jensen et al. |
| 2002/0198727 A1 | 12/2002 | Ann et al. |
| 2003/0046130 A1 | 3/2003 | Golightly et al. |
| 2003/0069821 A1 | 4/2003 | Williams |
| 2003/0126073 A1 | 7/2003 | Lawrence |
| 2003/0126181 A1 | 7/2003 | Young |
| 2003/0126431 A1 | 7/2003 | Beattie et al. |
| 2003/0149604 A1 | 8/2003 | Casati et al. |
| 2003/0216991 A1 * | 11/2003 | Baker ............ 705/36 |
| 2003/0225687 A1 | 12/2003 | Lawrence |
| 2003/0229525 A1 | 12/2003 | Callahan et al. |
| 2003/0233571 A1 | 12/2003 | Kraus et al. |
| 2003/0236725 A1 * | 12/2003 | Hickox et al. ............ 705/35 |
| 2004/0044617 A1 | 3/2004 | Lu |
| 2004/0117283 A1 * | 6/2004 | Germack ............ 705/35 |
| 2004/0122756 A1 * | 6/2004 | Creeden et al. ............ 705/35 |
| 2004/0128186 A1 | 7/2004 | Breslin et al. |
| 2004/0162741 A1 | 8/2004 | Flaxer et al. |
| 2004/0177326 A1 | 9/2004 | Bibko et al. |
| 2004/0181665 A1 | 9/2004 | Houser |
| 2004/0216039 A1 | 10/2004 | Lane et al. |
| 2004/0236740 A1 | 11/2004 | Cho et al. |
| 2004/0260566 A1 | 12/2004 | King |
| 2004/0260582 A1 | 12/2004 | King et al. |
| 2004/0260583 A1 | 12/2004 | King et al. |
| 2004/0260591 A1 | 12/2004 | King et al. |
| 2004/0260628 A1 | 12/2004 | Minton et al. |
| 2005/0197952 A1 | 9/2005 | Shea et al. |
| 2005/0209899 A1 | 9/2005 | King et al. |
| 2005/0228685 A1 | 10/2005 | Schuster et al. |
| 2005/0251464 A1 | 11/2005 | Ames et al. |
| 2006/0059026 A1 | 3/2006 | King et al. |
| 2006/0064365 A1 | 3/2006 | Yancey |
| 2006/0074739 A1 | 4/2006 | King et al. |
| 2006/0089861 A1 | 4/2006 | King et al. |
| 2006/0106686 A1 | 5/2006 | King et al. |
| 2006/0235732 A1 | 10/2006 | Miller et al. |
| 2006/0241991 A1 | 10/2006 | Pudhukottai et al. |
| 2007/0022025 A1 | 1/2007 | Litman et al. |
| 2007/0088636 A1 * | 4/2007 | Nault ............ 705/30 |
| 2007/0150330 A1 | 6/2007 | McGoveran |
| 2007/0156495 A1 | 7/2007 | King |

FOREIGN PATENT DOCUMENTS

WO  WO 2005/055098 A2  6/2005

OTHER PUBLICATIONS

NPL-2; The accounting std overload issue; Author-Hiltebeitel, Kenneth Merrill; 1985.*

NPL-3; Dialog® File 35: Dessertation Abs online © 2010 Proquest Info & Learnng. A ste of financial statements that included modified treatments for APB No. 11(Accounting for ncome Txaes), SFAS No. 13.*

Gray, N.S., "RISK.02, PRAM It or Walk Away," *AACE International Transactions*, 4 pages (1998).

Kim et al., "Using Enterprise Reference Models for Automated ISO 9000 Compliance Evaluation," *Proc. 35th Hawaii Int. Conf. System Sciences*, 10 pages, (2002).

Kokmen, L., "Web takes matchmaking to online level," Denver Post, Sep. 21, 1998, p. F.06; 2 pages downloaded from http://proquest.umi.com/pqdweb?index=27&sid=4&srchmode=1&vinst=PROD&fmt=3&clientId=19649&RQT=309&Vname=PQD.

Leymann et al., "Managing business processes as an information resource," *IBM Systems Journal*, 33(2):326-348 (1994).

King, N., "The convergence of financial and supply chain planning," *Management Accounting-London*, 77(5):30-34 (1999).

"Approva Introduces BizRights 2.0 Software to Facilitate More Secure, Effective Business Controls and Processes," *Business Wire*, Apr. 6, 2004, 3 pages, available at http://proquest.umi.com/pdqweb?did=609773321&sid=5&Fmt=3&clientId=19649&RQT=309&VName=PDQ.

Susan S. Lightly, Cynthia Waller Vallario; "Segregation of duties in ERP;" The Internal Auditor Altamonte Springs:; Oct. 2003; vol. 60; Issue 5; p. 27.

US Non-Final Office Action U.S. Appl. No. 10/464,875, dated on Mar. 19, 2009, pp. 17.

US Final Office Action for U.S. Appl. No. 10/988,041, dated on Mar. 16, 2009, pp. 14.

US Non-Final Office Action for U.S. Appl. No. 10/971,973, dated on Mar. 17, 2009, pp. 22.

Microsoft Project 2000 for Windows Product Enhancements Guide, Oct. 1999; 46 pages, Microsoft Corporation.

Non-Final Office Action for U.S. Appl. No. 10/464,417 mailed on Dec. 22, 2006; 21 pages.

Final Office Action for U.S. Appl. No. 10/464,417, mailed on Jan. 25, 2008; 20 pages.

Advisory Action for U.S. Appl. No. 10/464,417, mailed on May 7, 2008; 3 pages.

Non-Final Office Action for U.S. Appl. No. 10/464,417, mailed on Aug. 6, 2008; 30 pages.

Final Office Action for U.S. Appl. No. 10/464,417, mailed on Jan. 22, 2009; 32 pages.

Advisory Action for U.S. Appl. No. 10/464,417, mailed on Apr. 22, 2009; 3 pages.

Non-Final Office Action for U.S. Appl. No. 10/464,417, mailed on Jul. 9, 2009; 32 pages.

Non-Final Office Action for U.S. Appl. No. 10/464,421; mailed on Apr. 8, 2008; 9 pages.

Final Office Action for U.S. Appl. No. 10/464,421, mailed on Oct. 20, 2008; 21 pages.

Advisory Action for U.S. Appl. No. 10/464,421, mailed on Jan. 29, 2009; 3 pages.

Non-Final Office Action for U.S. Appl. No. 10/464,421, mailed on Jul. 9, 2009; 20 pages.

Non-Final Office Action for U.S. Appl. No. 10/464,815, mailed on Sep. 7, 2007; 9 pages.

Final Office Action for U.S. Appl. No. 10/464,815, mailed on Mar. 4, 2008; 11 pages.

Advisory Action for U.S. Appl. No. 10/464,815, mailed on Jun. 19, 2008; 3 pages.

Non-Final Office Action for U.S. Appl. No. 10/464,815, mailed on Sep. 4, 2008; 10 pages.
Final Office Action for U.S. Appl. No. 10/464,815, mailed on Feb. 18, 2009; 14 pages.
Non-Final Office Action for U.S. Appl. No. 10/464,874, mailed on Nov. 29, 2007; 9 pages.
Non-Final Office Action for U.S. Appl. No. 10/464,874, mailed on Jun. 11, 2008; 14 pages.
Non-Final Office Action for U.S. Appl. No. 10/464,874, mailed on Dec. 18, 2008; 15 pages.
Final Office Action for U.S. Appl. No. 10/464,874, mailed on Jul. 10, 2009; 15 pages.
Non-Final Office Action for U.S. Appl. No. 10/464,875, mailed on Mar. 10, 2008; 15 pages.
Non-Final Office Action for U.S. Appl. No. 10/464,875, mailed on Oct. 16, 2008; 15 pages.
Non-Final Office Action for U.S. Appl. No. 10/804,364; mailed on Mar. 21, 2008; 24 pages.
Final Office Action for U.S. Appl. No. 10/804,364; mailed on Oct. 14, 2008; 30 pages.
Non-Final Office Action for U.S. Appl. No. 10/804,364; mailed on Feb. 5, 2009; 26 pages.
Non-Final Office Action for U.S. Appl. No. 10/804,364; mailed on Aug. 18,2009; 27 pages.
Non-Final Office Action for U.S. Appl. No. 10/926,194; mailed on May 28, 2008; 28 pages.
Non-Final Office Action for U.S. Appl. No. 10/926,194, mailed on Dec. 18, 2008; 47 pages.
Non-Final Office Action for U.S. Appl. No. 10/926,194; mailed on Aug. 17, 2009; 40 pages.
Non-Final Office Action for U.S. Appl. No. 10/946,146; mailed on Jun. 27, 2008; 18 pages.
Final Office Action for U.S. Appl. No. 10/946,146; mailed on Dec. 24, 2008; 20 pages.
Advisory Action for U.S. Appl. No. 10/946,146; mailed on Mar. 16, 2009; 4 pages.
Non-Final Office Action for U.S. Appl. No. 10/946,146; mailed on May 27, 2009; 29 pages.
Non-Final Office Action for U.S. Appl. No. 10/988,041; mailed on Jun. 12, 2007; 7 pages.
Non-Final Office Action for U.S. Appl. No. 10/988,041; mailed on Dec. 11, 2007; 10 pages.
Final Office Action for U.S. Appl. No. 10/988,041; mailed on May 14, 2008; 16 pages.
Advisory Action for U.S. Appl. No. 10/988,041; mailed on Jul. 29, 2008; 3 pages.
Non-Final Office Action for U.S. Appl. No. 10/988,041, mailed on Sep. 26, 2008; 14 pages.
Non-Final Final Office Action for U.S. Appl. No. 11/114,978; mailed on Nov. 15, 2007; 9 pages.
Final Office Action for U.S. Appl. No. 11/114,978; mailed on Mar. 28, 2008; 13 pages.
Advisory Action for U.S. Appl. No. 11/114,978; mailed on Jun. 5, 2008; 3 pages.
Non-Final Final Office Action for U.S. Appl. No. 11/114,978; mailed on Aug. 25, 2008; 7 pages.
Notice of Allowance for U.S. Appl. No. 11/114,978; mailed on Jan. 14, 2009; 10 pages.
Notice of Allowance for U.S. Appl. No. 11/114,978; mailed on Mar. 9, 2009; 3 pages.
Final Office Action for U.S. Appl. No. 10/464,417; mailed on Jan. 20, 2010; 35 pages.
Non-Final Office Action for U.S. Appl. No. 10/464,874; mailed on Dec. 28, 2009; 16 pages.
Advisory Action for U.S. Appl. No. 10/464,875; mailed on Dec. 29, 2009; 3 pages.
Final Office Action for U.S. Appl. No. 10/464,421; mailed on Jan. 27, 2010; 23 pages.
Non-Final Office Action for U.S. Appl. No. 10/926,194; mailed on Mar. 2, 2010; 23 pages.
Non-Final Office Action for U.S. Appl. No. 10/971,973; mailed on Feb. 19, 2010; 17 pages.
Non-Final Office Action for U.S. Appl. No. 11/327,053; mailed on Mar. 17, 2010; 32 pages.
Advisory Action for U.S. Appl. No. 10/464,874 mailed on Oct. 9, 2009; pp. 2.
Final Office Action for U.S. Appl. No. 10/464,875 mailed on Oct. 27, 2009; 21 pages.
Final Office Action for U.S. Appl. No. 10/971,973; mailed on Sep. 30, 2009, 31 pages.
Advisory Action for U.S. Appl. No. 10/971,973; mailed on Dec. 7, 2009; 4 pages.
Non-Final Office Action for U.S. Appl. No. 10/464,417 mailed on May 21, 2010; 31 pages.
Advisory Action for U.S. Appl. No. 10/464,421 mailed on Apr. 15, 2010; 2 pages.
Higuera et al., "Software Risk Management," Technical Report, CMU/SEI-96-TR-012, ESC-TR-096-012, by Software Engineering Institute, Carnegie Mellon University, Jun. 1996.
Notice of Allowance for U.S. Appl. No. 11/327,053 mailed on Oct. 4, 2010; pages.
Notice of Allowability for U.S. Appl. No. 11/327,053 mailed on Nov. 17, 2010; pages.
Notice of Allowance for U.S. Appl. No. 10/464,417 mailed on Nov. 12, 2010; pages.
Abu-Musa, "Auditing E-Business: New Challenges for External Auditors," Journal of American Academy of Business, Mar. 2004, vol. 4 No. 1/2; 13 pages.
Abhay, "Prepare your computer system for inspection; analysis of two years of FDA warning letters will tell you what is under the microscope," Biopharm International, Feb. 2005, vol. 18, No. 2 , ISSN: 1542-166X; 10 pages.
Pierce, "International Standards on Auditing: An Update," Accountancy Ireland, Jun. 2005, vol. 37, No. 3, ISSN: 0001-4699; 5 pages.
"Year 2000 Wire/WRQ Express 2000 Software Manager Eradicates PC Millennium Bug Now; and Pays Back the Investment by Managing Other Issues Beyond 2000" Business Editors /Technology and Y2K Writers, Oct. 5, 1998, Business Wire, New York ; 3 pages.
Non-Final Office Action for U.S. Appl. No. 10/464,874 mailed on Jul. 8, 2010; 12 pages.
Final Office Action for U.S. Appl. No. 10/926,194 mailed on Aug. 16, 2010; 22 pages.
Final Office Action for U.S. Appl. No. 10/971,973 mailed on Aug. 20, 2010; 25 pages.

* cited by examiner

IMPACTED FINANCIAL STATEMENTS

BACKGROUND OF THE INVENTION

The present invention relates to the field of software applications generally, and specifically to the implementation of financial applications. The corporate accounting scandals surrounding WorldCom, Enron and Tyco in 2002, have spurred the passage of the Sarbanes-Oxley Act of 2002. The Act creates an obligation for officers of a company to warrant to their shareholders the accuracy of the company's accounting information, the controls in place to safeguard the assets of the company, and the validity of the financial statements they produce. Although these obligations have previously existed in a weaker form in the United States, the advent of the Sarbanes-Oxley Act has made these obligations much stronger. Any company that is listed on an American stock exchange has these obligations.

The Act codifies a framework for internal accounting controls specified by the committee of Sponsoring Organizations of the Treadway Commission (COSO). COSO establishes three categories of controls: Effectiveness and Efficiency of Operations; Reliability of Financial Reporting; and Compliance with Laws and Regulation. COSO also establishes five interrelated components of effective internal control: Control Environment; Risk Assessment; Control Activities; Information and Communications; and Monitoring. In summary, the methodology prescribed by COSO includes identifying the opportunities for fraudulent reporting, determining the risks arising from these opportunities, and then providing accounting controls to mitigate these risks.

Although compliance with the Act is reason enough to implement this framework, enterprises also benefit (in the form of higher stock prices) from the increased confidence of their shareholders. The framework bestows additional benefits to the enterprise, including: the ability to identify and reengineer processes that are inefficient; the ability to identify redundant control procedures; and the ability to improve managerial controls.

Addressing the requirements of the Sarbanes-Oxley is an urgent need. It is desirable to have an audit system that enables an enterprise to efficiently implement the requirements of the Act. It is desirable for an audit system to: 1) configure and implement audit processes; 2) determine the set of risks associated with the business processes of an enterprise; 3) apply a set of controls to the business processes of an enterprise to mitigate the set of associated risks; 4) continuously monitor the effectiveness of a set of controls; 5) determine when business processes used by an enterprise have deviated from a model process; 6) certify new business processes; 7) integrate business processes and their associated risks and controls with financial statements; and 8) create audit procedures to be followed by auditors and employees to implement audit processes. It is further desirable to provide a hosted service to provide auditors with a set of audit procedures and to enable auditors to track compliance with these procedures for a set of standard business processes.

BRIEF SUMMARY OF THE INVENTION

An embodiment of the invention is a system for displaying financial information including a financial statement having a set of financial accounts, a set of business processes associated with the set of financial accounts, and an impacted financial statement manager adapted to display the financial statement and the associated set of business processes.

Another embodiment includes a set of risks associated with the set of financial accounts. The impacted financial statement manager is adapted to display the financial statement and the set of risks associated with the set of financial accounts. In an embodiment, the set of risks is associated with the set of financial accounts via an association with the set of business processes.

In yet another embodiment, a set of risk controls are associated with the set of financial accounts. The impacted financial statement manager is adapted to display the financial statement and the set of risk controls associated with the set of financial accounts. In an embodiment, the set of risk controls is associated with the set of financial accounts via an association with the set of risks and an association with the set of business processes.

In a further embodiment, the impacted financial statement manager is further adapted to import the financial statement. In one embodiment, the financial statement is encoded in XML format. In another embodiment, the impacted financial statement manager is adapted to parse the financial statement to identify a set of financial accounts associated with the financial statement and to match the set of business processes with the financial statement according to their associated financial accounts.

In yet a further embodiment, a set of sample transactions is associated with the set of financial accounts. In this embodiment, the impacted financial statement manager is adapted to display the financial statement and the set of sample transactions associated with the set of financial accounts. Additionally, the set of sample transactions are associated with the set of financial accounts via an association with the set of business processes.

An embodiment of the invention includes a web server adapted to present a web page to a web browser of a user. In this embodiment, the impacted financial statement manager is adapted to create a web page displaying the financial statement and the associated set of business processes.

BRIEF DESCRIPTION OF THE DRAWINGS

The present invention will be described with reference to the drawings, in which.

DETAILED DESCRIPTION OF THE INVENTION

The present invention enables auditors to efficiently and effectively audit the business processes of an enterprise. An embodiment of the audit system: 1) configures and implements audit processes; 2) determines the set of risks associated with the business processes of an enterprise; 3) applies a set of controls to the business processes of an enterprise to mitigate the set of associated risks; 4) continuously monitors the effectiveness of a set of controls; 5) determines when business processes used by an enterprise have deviated from a model process; 6) certifies new business processes; 7) integrates business processes and their associated risks and controls with financial statements; and 8) creates audit procedures to be followed by auditors and employees to implement audit processes. An embodiment of the audit system includes a hosted service that provides auditors with a set of audit procedures and enables auditors to track compliance with these procedures for a set of standard business processes.

Figure 1:
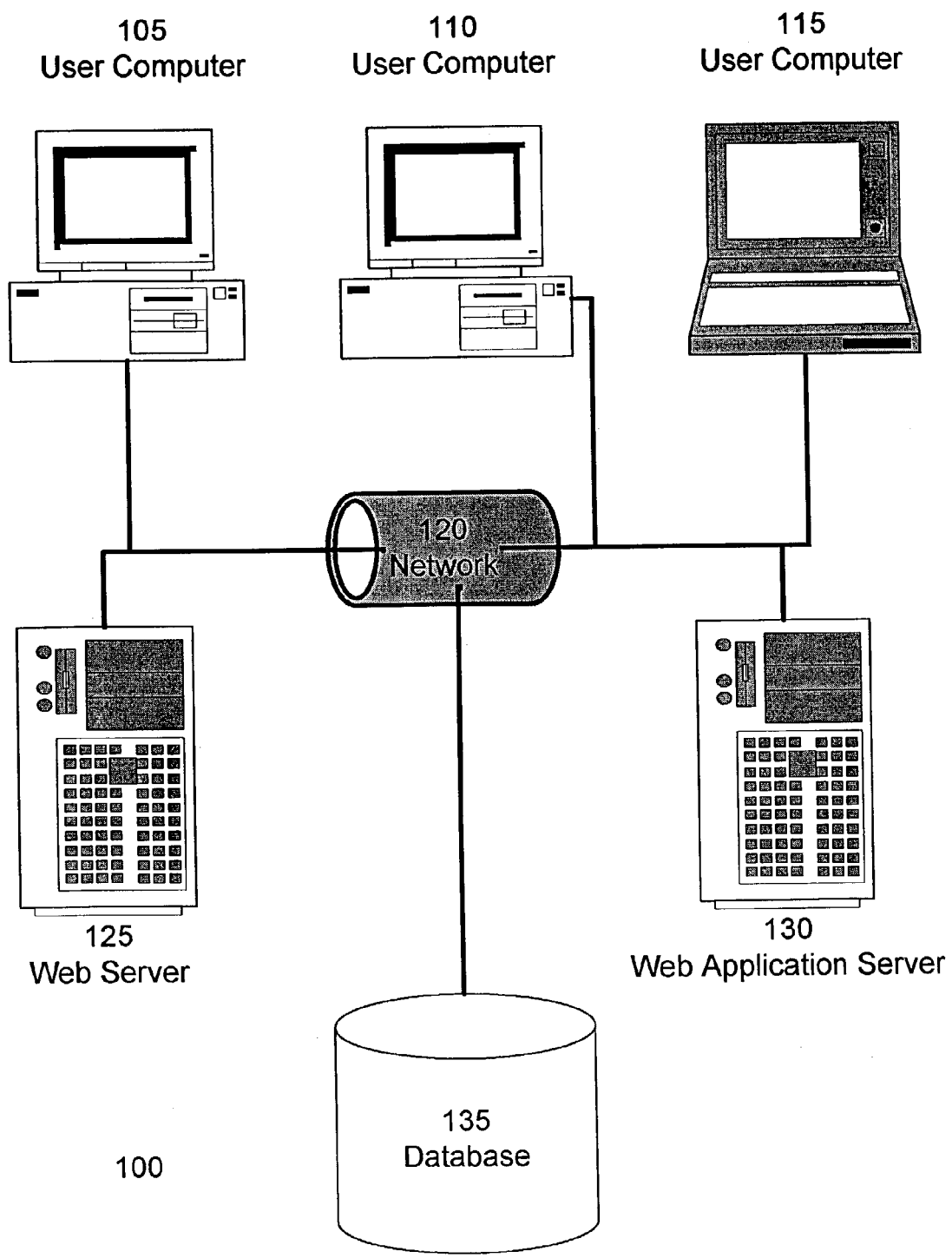
FIG. 1 is a block diagram of a system for implementing an embodiment of the invention.

FIG. 1 is a block diagram of a system 100 for implementing an embodiment of the invention. System 100 includes user computers 105, 110, and 120. User computers 105, 110, and 120 can be general purpose personal computers having web browser applications. Alternatively, user computers 105, 110, and 120 can be any other electronic device, such as a thin-client computer, Internet-enabled mobile telephone, or personal digital assistant, capable of displaying and navigating web pages or other types of electronic documents. Although system 100 is shown with three user computers, any number of user computers can be supported.

A web server 125 is used to process requests for web pages or other electronic documents from user computers 105, 110, and 120. In an embodiment of the invention, all user interaction with the audit system is via web pages sent to user computers via the web server 125.

Web application server 130 operates the audit system. In an embodiment, the web application server 130 is one or more general purpose computers capable of executing programs or scripts in response to the user computers 105, 110 and 115. The web application can be implemented as one or more scripts or programs written in any programming language, such as Java™, C, or C++, or any scripting language, such as Perl, Python, or TCL.

In an embodiment, the web application server 130 dynamically creates web pages for displaying the audit system and audit output data. The web pages created by the web application server 130 are forwarded to the user computers via web server 125. Similarly, web server 125 receives web page requests and audit input data from the user computers 105, 110 and 120, and forwards the web page requests and audit input data to web application server 130.

As the web application on web application server 130 processes audit data and user computer requests, audit data can be stored or retrieved from database 135. Database 135 stores general audit data used by every user for every audit in the enterprise. Database 135 also stores audit data associated with individual audits and/or individual users of the audit system. In an embodiment, the web application on the web application server 130 can retrieve any previously stored data from the model database 135 at any time. This allows users to modify or update audit data.

An electronic communication network 120 enables communication between computers 105, 110, and 115, web server 125, web application server 130, and database 135. In an embodiment, network 120 may further include any form of electrical or optical communication devices, including wireless and wired networks. Network 130 may also incorporate one or more local-area networks, such as an Ethernet network; wide-area networks, such as the Internet; and virtual networks, such as a virtual private network.

The system 100 is one example for executing an audit system according to an embodiment of the invention. In another embodiment, web application server 130, web server 125, and optionally model database 135 can be combined into a single server computer system. In alternate embodiment, all or a portion of the web application functions may be integrated into an application running on each of the user computers. For example, a Java™ or JavaScript™ application on the user computer is used to process or store audit data or display portions of the audit application.

Figure 2:
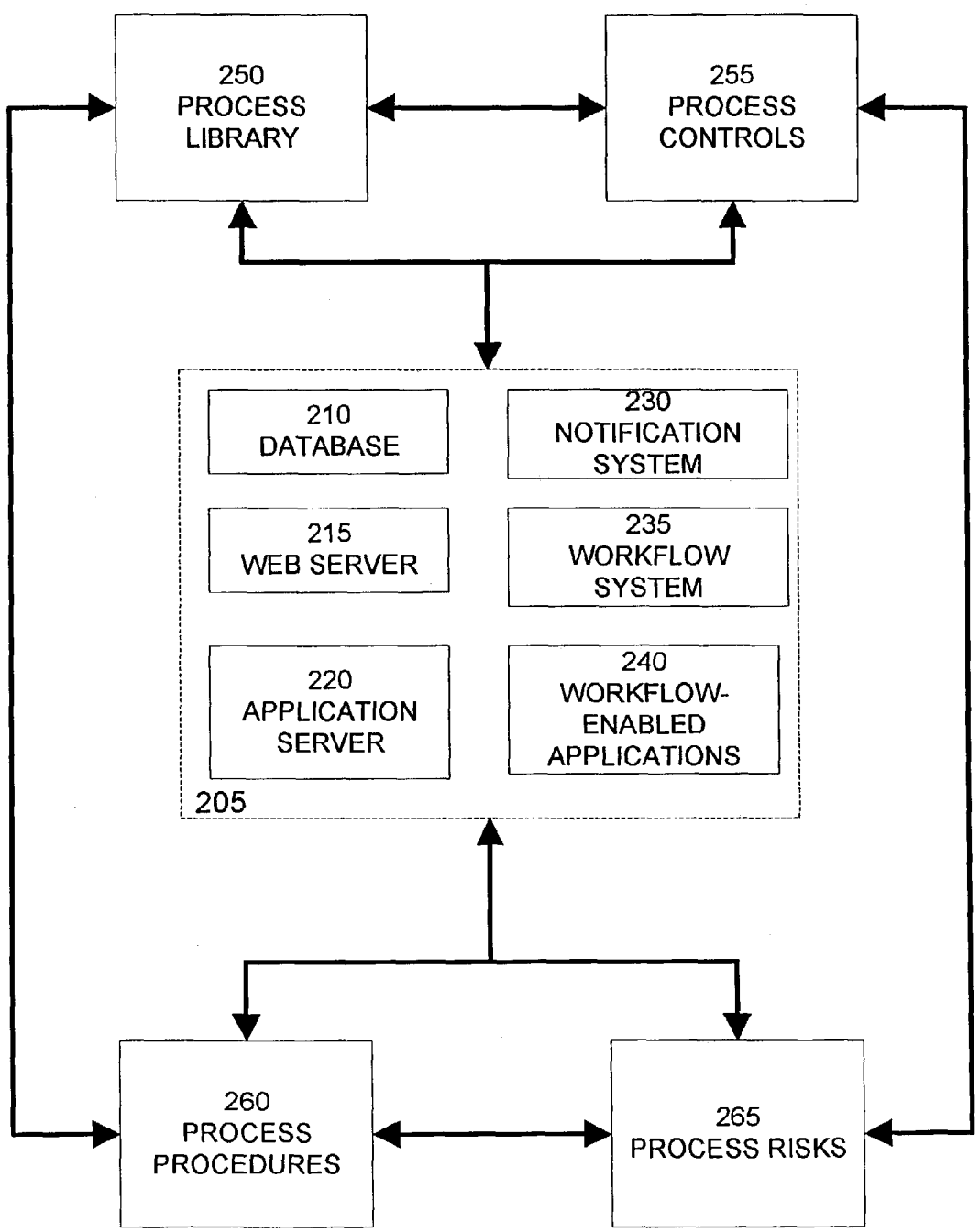
FIG. 2 is a block diagram illustrating a set of applications and data objects used by an embodiment of the invention.

FIG. 2 is a block diagram 200 illustrating a set of applications 205 and data objects used by an embodiment of the invention. The set of applications 205 include a database 210, a web server 215, and an application server 220, similar to that discussed above. Additionally, the set of applications include a notification system 230, a workflow system 235, and a set of workflow-enabled applications 240.

The notification system 230 enables communication between audit system users and the audit system. Communications can be in the form of electronic messages such as electronic mail and instant messages. The notification system 230 can be used to gather data and to distribute information or instructions from audit system users or other individuals. Communications can include forms or questionnaires to be completed by recipients. Users return the completed form to the notification system 230. The notification system 230 then processes the completed forms to extract the data provided by users. The notification 230 can transfer extracted data to any of the other applications or to other audit system users.

The workflow system 235 enables the implementation of business processes. A business process is a planned series of work activities with defined inputs and results. The workflow system allows business processes to be defined for any of the operations of a business enterprise. A business process can define the steps needed to complete an operation, the personnel responsible for performing each of the steps, and the inputs and outputs of each of the steps. Business processes can include conditional branches, so that different work activities are performed in response to the result of one or more previous work activity. In an embodiment, the workflow system 235 has a graphical user interface for visually defining a business process in a manner similar to drawing a flowchart.

In an embodiment, the workflow system 235 is linked to a set of workflow-enabled applications. In this embodiment, the workflow system 235 is not only a drafting tool for defining business process, but also directly controls the operations of the workflow-enabled applications. Each activity in the business process is linked to an underlying function of a workflow-enabled application. Selecting an activity in a business process invokes the associated function of the workflow-enabled application.

For example, a business process can define the work activities to be followed to pay an invoice can be linked to a workflow-enabled accounts payable application. The workflow-enabled accounts payable application will operate according to the business process defined by the workflow system. If, for example, the workflow system specifies that invoices over a threshold amount, for example $100,000, be routed to a senior manager for approval, while invoices under this threshold can be approved by a junior manager, then the workflow-enabled accounts payable application will route all invoices received according to this criteria. In a further example, the notification system 230 can be used to route invoices and collect approvals as specified by the business process.

The set of workflow-enabled applications can include applications adapted to a variety of business operations, including purchasing applications, such as Oracle Purchasing, general ledger applications, such as Oracle General Ledger, project management applications, such as Oracle Projects, accounts payable and receivable applications, such as Oracle Payables and Oracle Receivables, human resources applications, such as Oracle Human Resources, account generation applications, such as Oracle Account Generator, service applications, such as Oracle Service, engineering management applications, such as Oracle Engineering, inventory applications, such as Oracle Inventory, web employee applications, such as Oracle Web Employees, web customer applications, such as Oracle Web Customers, web supplier applications, such as Oracle Web Suppliers, and implementation applications, such as Oracle Implementation Wizard.

In addition to the set of applications 205, a set of data objects are used by the audit system. A process library 250 is a set of business processes implemented in the workflow system 235 and, in an embodiment, associated with workflow-enabled applications 240. A typical process library can include over one thousand different business processes. Business processes can be generally applicable to all businesses, or specific to a certain type of business or industry.

A set of process risks 265 are associated with the business processes of the process library. A process risk is an undesirable outcome of a business process. Risks can result from a variety of sources, including from employees failing to follow the steps of a business process, from mistakes or wrong decisions made by employees, from employee malfeasance, and from business effects, such as customers failing to pay bills. Risks can be classified into categories, such as the type of risk, the organizations affected by the risk, and the severity of the risk. Each business process can be associated with one or more process risks, and conversely, each process risk can be associated with one or more business processes.

A set of process controls 255 are associated with the set of process risks 265 and the business processes of the process library 250. Controls are additional processes, conditions, and/or notifications intended to mitigate the associated risks. A control can be a manual control instructing an employee to verify a physical condition. A manual control can be implemented using the notification system. For example, control may require that a signature file or other valuable item be secured in a safe. In this example, the notification system will send a verification request to a trusted employee. The trusted employee will check to ensure the item is secured, and then respond to the verification request. The notification system will record the employee's verification for future reference.

A control can also be another business process implemented by one or more workflow-enabled applications. For example, an invoice control can be a two-, three-, or four-way matching of a received invoice with a purchase order, an inventory record for the associated item, and/or an acknowledgement of the acceptance of the item. These matching operations can be defined as a business process in the workflow system and executed by the functions of underlying work-flow enabled applications.

A set of process procedures 260 is associated with the other data objects. The process procedures provide documentation for performing the business processes of the process library 250. A typical set of procedures can include hundreds of different procedures for performing all or portions of the different types of business processes. The process procedures provide documentation to employees assigned to perform all or a portion of a business process on the appropriate way to perform their assigned tasks. In an embodiment, a procedure can be associated with more than one type of business process. Additionally, the set of process procedures 260 include audit procedures for auditing the business processes. The audit procedures are associated with one or more business processes of the process library 250. The audit procedures provide auditors with documentation for auditing the associated business process. Auditors assigned to a specific business process can retrieve the appropriate audit procedures from the set of process procedures 260.

Figure 3:
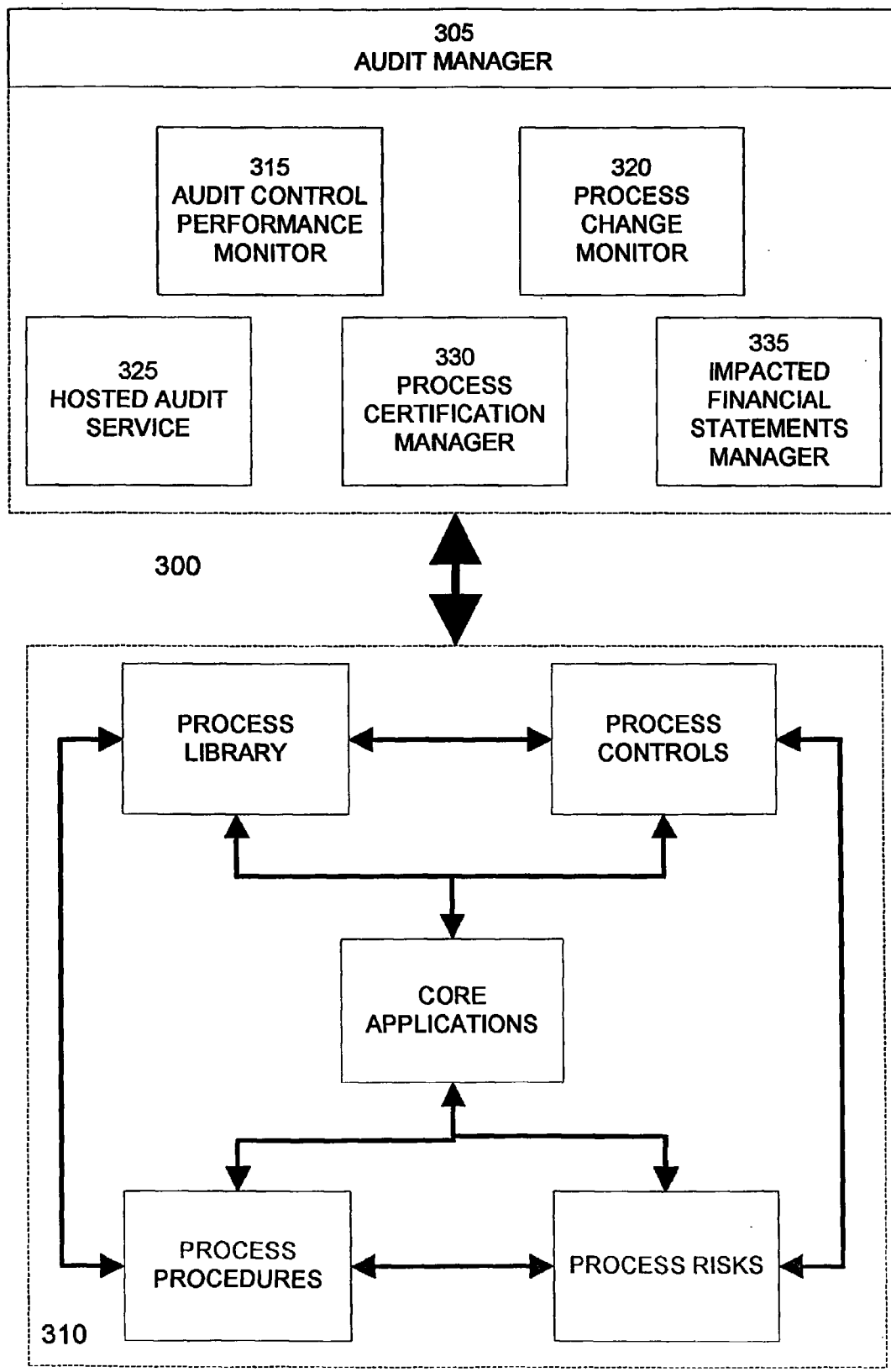
FIG. 3 is a block diagram illustrating an embodiment of the invention.

FIG. 3 is a block diagram 300 illustrating an embodiment of the invention. A set of data objects and core applications, such as that discussed in FIG. 2, is interfaced with an audit manager 305.

The audit manager 305 provides a central interface to all audit related tasks in an enterprise. The audit manager 305 enables auditor to develop a picture of the processes of the company, similar to the library needed for ISO 9000 compliance audit. The audit manager 305 allows processes to be viewed and decomposed into many levels.

Additionally, as part of the internal audit function is maintaining the relationship between a business process and the financial accounts that it impacts. For example, the Order to Cash process affects the Revenue, Deferred Revenue, Cost of Goods Sold, Finished Goods Inventory, and Accounts Receivable Control accounts. The audit manager 305 enables an auditor to efficiently view a business process and its associated financial accounts.

The audit manager 305 enables auditor to associate risks for each process and the controls that mitigate each risk. The audit manager 305 can associate controls in the form of additional workflows or business processes to manage a risk. For example a control can enable processes such as profit screening or notification of a low margin order to finance ratio. As discussed below, controls can be continuously monitored for variances in Key Performance Indicators (KPI) recorded in a Performance Management Framework (PMF). Each KPI can have associated control limits or tolerances. If a process exceeds any of its KPI, an audit function or process can be automatically initiated by the audit manager 305.

An additional type of control risk arises from insufficient segregation of duties. If too many workflow activities are concentrated in a single person, the chance of employee errors or malfeasance going undetected is greatly increased. The audit manager 305 enables auditors to confirm that there are no employees that have access to pairs or groups of functions that are inconsistent with good internal controls. An example of functions that should be segregated are authorizing new suppliers and authorizing checks. As business processes are created, segregated functions are identified. The audit manager accesses the organizational structure of the enterprise to ensure that segregated function are not performed by the same person.

The audit manager 305 also includes project templates defining standard audit procedures for each business process. In an embodiment, the project templates for audit procedures are defined in a workflow-enabled project management application linked with the business process in the workflow system. In this embodiment, the project templates for auditing a business process are workflows defined by the workflow system. An audit project template can include standard audit procedures, document templates, and standard deliverables needed for an audit of an associated business process. The audit manager 305 is interfaced with a workflow-enabled project management application to enable collaboration between auditors by providing planning functions, task assignment functions, progress tracking functions, communication functions, and document management functions. Task assignment functions enable the project management application to locate available people with the skill set to match assignments. Progress tracking functions enable the project management function to monitor progress against milestones.

When initiating an audit of a business process, the audit manager 305 uses the project management application to create an audit project from the appropriate audit project template. Audit project can be initiated as a scheduled activity or as the result of an trigger event, such as a large accounts receivable write off. As discussed elsewhere, the performance management framework enables auditors to continuously monitor Key Performance Indicators (KPI) to determine if a trigger criteria has fallen out of tolerance.

The audit manager 305 executes the audit project using the functions of the underlying project management application. The audit manager uses the project management application to record audit issues warranting further investigation, to record follow ups to audit issues, and to resolving an audit opinion differences, which exist when two auditors have differing opinions on whether a process is in control or not. In an embodiment, a threaded discussion capability, included as part of the notification system, is used to resolve audit opinion differences. The audit manager 305 can store and manage supporting documentation in a document management system. The supporting documentation may be references to transactions or electronic documents, including documents developed in other tools such as spreadsheets, review notes, scanned documents, and other portable document formats.

The audit manager 305 also employs specialized computer-aided audit tools. Examples of these tools include risk assessment tools such as Ratio Calculators, Anomaly Detectors, Sampling Methods, Process Controls Reports, and Fraud Detectors. A fraud detector is a tool used to detect suspicious transactions, such as identifying people who submitted more than one expense report for a given week or expense reports with more than $100 of expenses without receipts.

The audit manager 305 further includes audit functions linked to standard financial reports, such as Subledger to General Ledger Integrity or Profit Reconciliation. Audit functions can also be linked to compliance reports, which guide the auditor through checking compliance with regulations like SOP 97-2, or checking contingent liabilities from a supply contract. Audit functions can also be linked to IT reports. For example, an IT report can identify users authorized to create payables invoices.

An embodiment of the audit manager 305 is tightly integrated with the workflow system and the workflow-enabled applications. As a project status is changed or task is changed a workflow is initiated and reviewers and approvers of the project are notified by the notification system, for example by e-mail. The audit project status can be linked to the final audit opinion, so that the notification system automatically notifies the appropriate people of the audit finding.

An embodiment of the audit manager 305 also integrates with a mapping between the organization units in an enterprise and the business processes that they perform. As each organization may be running a slight variation of a standard business process, the audit manager includes a process change monitor and process certification manager, discussed below, to identify process variations and to ensure that each organizations' business processes are approved. Additionally, the audit manager 305 can associate an audit schedule with an organization based upon the mapping of business processes to the organization. For example, an Accounts Receivable process might require auditing every 6 months. Based upon the mapping between organizational units and business processes, the audit manager identifies organizational units that employ the Accounts Receivable process and automatically schedule audit projects for these organizational units.

As discussed above, the Sarbanes-Oxley Act requires corporations to conduct surveys of management and to enable anonymous reporting of potential problems. An embodiment of the audit manager 305 includes a survey facility to survey management on their opinion of the adequacy of internal controls and to enable anonymous "whistleblower" reporting. The survey facility employs the notification system. Survey users can route their responses to one or more specific organizational levels, to ensure that an issue receives appropriate attention. Like audit issues, the notification system can track follow-up responses to a survey issue in a threaded message format, and survey respondents can anonymously view follow-ups to their issues and can anonymously add their own follow-up responses.

The audit manager 305 includes a number of supporting modules for performing audit-related tasks. These modules work in conjunction with the audit manager 305 and include an audit control performance monitor 315, a process change monitor 320, a hosted audit service 325, a process certification manager 330, and an impacted financial statements manager 335. The operation of these modules will be discussed in detail below.

Figure 4:
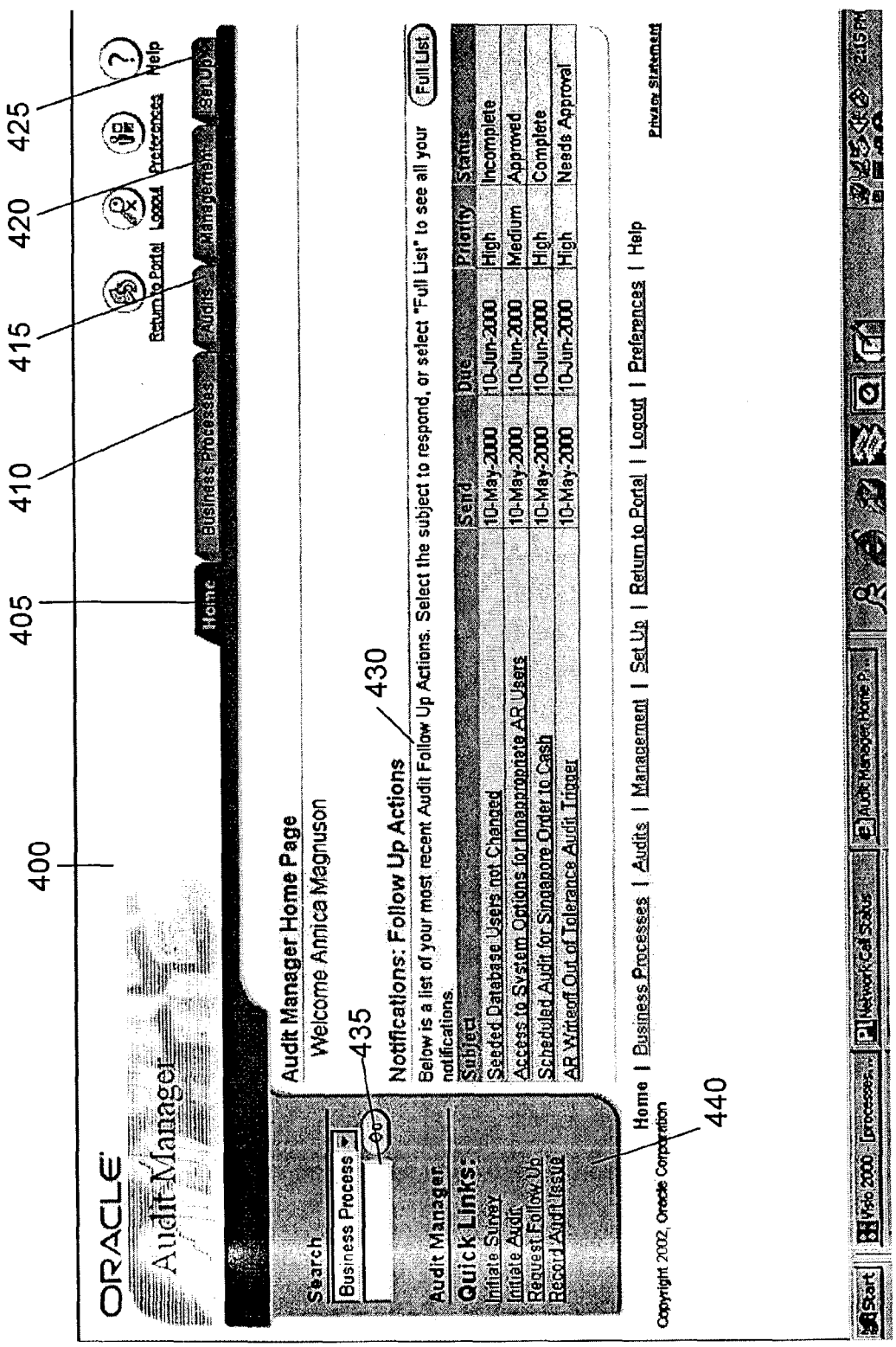
FIG. 4 is an example screen display of an embodiment of the invention.

FIG. 4 is an example screen display 400 of an embodiment of the audit manager. In an embodiment of the invention, screen display 400 is presented to a user via a web browser. Screen display 400 includes tabs 400, 410, 415, 420, and 425 for navigating between sets of audit functions and audit information. By selecting a different one of the tabs, the user is presented with a different set of audit functions and audit information.

Home tab 405 corresponds to a default, or home, display where relevant daily information is presented to users. In FIG. 4, the screen display 400 corresponds to an example home page, and the Home tab 405 is shaded to indicate to the user that the home page is the current display.

The home page includes a notifications section 430 displaying a subset of the audit issues and audit tasks to be performed by the user. The home page is personalized for each user, so that each user is presented with relevant audit issues and tasks. The notifications section 430 can include alerts to any outstanding follow up actions that have not been implemented, to any processes that have fallen outside of acceptable performance limits, and to any organization units that are due an audit according to the audit schedule of the organization.

The Business Processes tab 410 enables auditors to document the business processes and relevant surrounding information to be audited. The Audit Tab 415 enables auditors to define standard audit workflows for the audit of specified Business Processes, Audit Approaches and Lines of Business. The Management Tab 420 enables the manager of the audit department to plan the resources and skills needed for audit projects. The Set Up Tab 425 enables the manager of the audit department to set the audit schedule for the Business Processes and to assign the business processes to organization units. Tabs 410, 415, 420, and 425 are discussed in more detail below.

A search function 435 enables audit managers to search for audit relevant information using the search box. Auditors can search for information by business process, auditor, a standard workflow, an audit project, a procedure in the standard procedures manual, or a predefined risk.

The home page also presents frequently performed tasks and functions in the Quick Links section 440. In display 400, the Quick Links section includes task such as initiating a survey of management's assessment of the effectiveness of internal controls, initiating a new audit project, requesting follow up on a particular audit issue, and recording a new audit issue.

Figure 5:
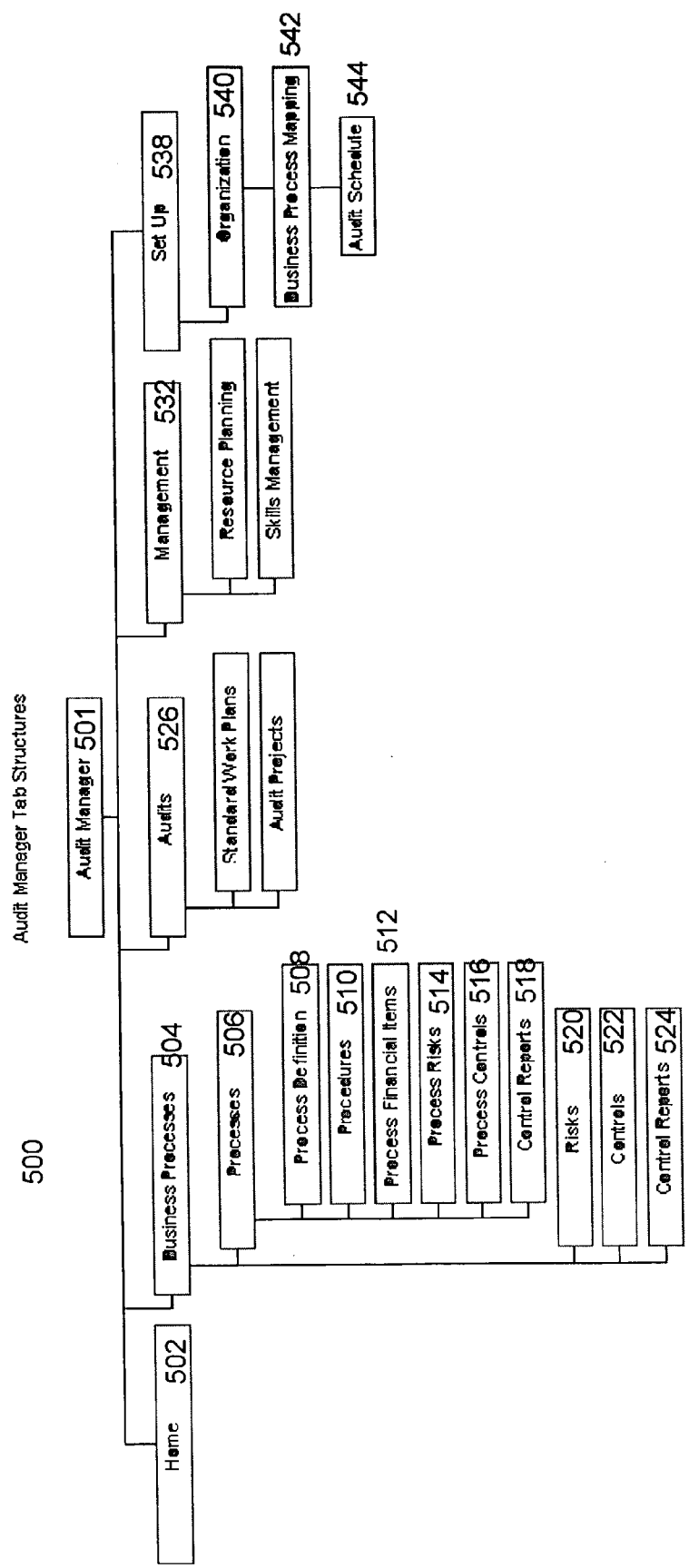
FIG. 5 is a block diagram of the user interface of an embodiment of the invention.

FIG. 5 is a block diagram 500 of the user interface of an embodiment of the invention. Block diagram 500 illustrates the user-interface tabs discussed above and their associated sub-functions. FIG. 5 is provided to explain the functions of the invention in an organized fashion and alternate embodiments of the invention may arrange these functions differently.

The business processes tab 504 include processes selection 506 for viewing details of one or more business processes. As discussed above, an embodiment of the invention employs the workflow system not only as a drafting tool for the designer of the business process, but also as the actual implementation of the business process. The processes selection 506 enables access to the database of business processes and process activities. In an embodiment, the business processes are displayed in the menu system. Users can navigate to different processes and invoke their underlying functions in workflow-enabled applications. Business processes can reference other business processes.

Before being deployed by an enterprise, business process need to be certified. Certification ensures that the process complies with the standards of the enterprise. In an embodiment, selection 506 additionally displays the certification status of a business process. Example values of certification status include "Requested", which indicates that certification is requested, "Certified," which indicates that the manager or employee responsible for a process has certified that this process has been approved, and "Attested," which indicates that an auditor has verified the adequacy of the controls of a business process.

A "Request Certification" function is provided by selection 506 to initiate certification of a business process. The certification function sends a notification to all process owners, who are managers responsible for all or a portion of a process, to certify the business processes have adequate internal controls. Process owners of higher level processes can review the certification status of subsidiary processes as part of their own certification process. The responses of these notification are processed to determine the certification status of the business process.

Selection 510 displays procedures associated with business processes. As discussed above, a set of procedures are associated with business processes. These procedures can be modified to fit the needs of the enterprise. In a further embodiment, the procedures are integrated with a workflow-enabled training application, such as Oracle iLearning. Employees are trained in procedures by the training application. In this embodiment, selection 510 allows auditors to track the progress of employees in studying the procedures.

Selection 514 displays risks associated with business processes. The Risks selection 514 from within the Processes tab 506 displays the risks that relate to the each business process in a table. In an embodiment, each risk is classified according to its probability and impact. For example, the risk of a loss making order being accepted may have a low probability and a high impact. Similarly, the risk of a salesperson accepting a kickback from a distributor may have a high probability and a low impact. Users can select risks from within the table and review the controls that apply to that risk. Users can create a new association between an existing risk and a business process, or add a new risk and associate the risk with one or more business processes.

Selection 516 displays the controls used to mitigate risks associated with the business processes. For example, one risk associated with the order to cash cycle might be the risk of customer default. Controls that address this risk might include setting approval limits for credit granting authority, ensuring the separation of duties between sales and credit management, and setting credit holds if an account is over 45 days past due. Each of these controls can be associated with one or more risks, or vice-versa.

In an embodiment, controls are of one of three general types. First, audit trigger events are controls that trigger audit events in response to variances in control limits or tolerances monitored by the performance management framework.

Second, workflow definition controls are additional workflow processes or sub-process integrated with the workflow of a business process to mitigate an associated risk. For example, a workflow definition control for a sales quotation process adds functions that perform profit screening or notification of a low margin order to finance. If a sales quotation business process is implemented by a workflow-enabled application, then the workflow definition controls will automatically implemented by the workflow-enabled application.

Third, controls can be included in profiles and system options. These controls change the settings or configuration of one or more workflow-enabled applications to implement a control.

An embodiment of the selection 516 displays controls within a table. Users can select controls and review the risks associated with each control. Users can also select controls and view the associated business processes. Users can create a new association between an existing control and a risk, or add a new control and associate the control with one or more risks.

Selection 512 displays financial items associated with business processes. A desirable result of auditing is determining the relationships between business processes and the key financial accounts they impacts. For example, the Order to Cash process effects the Revenue, Deferred Revenue, Cost of Goods Sold, Finished Goods Inventory, and Accounts Receivable Control accounts. Verifying the balances in an account requires an understanding of the processes affecting the account and the risks associated with these processes.

Selection 512 enables auditors to associate business processes to one or more key accounts. Auditors can then view financial accounts to determine the set of business processes, risks, or controls associated with each account.

In an embodiment, an impacted financial statement can be created from the set of business processes, risks, and controls. An impacted financial statement is a financial report, such as a balance sheet, annotated with information from the set of business processes, risks, and controls. A user can view the impacted financial statement as an electronic document. By selecting one or more line items on the impacted financial statement, users can view the risks, controls, and processes impacting the selected line.

A further embodiment of the invention can import financial data, such as account information, as XML files employing a standard XML schema for financial data. One such scheme is the XBRL standard taxonomy. The XML file is parsed to identify the financial accounts. Information from each identified financial account is then matched with the financial information associated with the set of business processes. An impacted financial statement is then created by combining the account information from the XML file with the associated business processes.

Selection 518 enables auditors to monitor the effectiveness of controls. The Audit manager utilizes the Performance Management Framework (PMF) integrated with a set of workflow-enabled applications to assign process objectives to a business process. The PFM can define process objectives as either control objectives or performance objectives. For example, the Accounts Receivable Department of a company may have performance objectives that are consistent with minimizing working capital requirements. An example of a performance objectives might be to minimize Days Sales Outstanding. The accounts receivable department may also have control objectives that are consistent with separation of credit granting authority and sales commitments. An example of a control objective might be to minimize Costs of Bad Debt.

The PFM enables users to associate one or more key performance indicators (KPI), which are quantitative measurements of compliance with a control or performance objective, to a business process. KPI can also be associated with controls to monitor risk mitigation. Each KPI has a desired objective value. The PFM continuously monitors the KPI for deviations from the desired objective value. Any deviations in KPI values outside a defined tolerance value triggers an audit event.

Selection 518 allows auditors to review the control and performance objectives associated with a business process, and enables auditors to add additional control and performance objectives in the form of KPI to business process. This allows auditors to determine whether control and performance objectives are in place to allow management to see if its objectives are being met. By integrating the PFM with the business processes defined by the audit manager, the audit manager enables managers and auditors to monitor the enterprise's performance with regard to both process objectives and risk mitigation.

Risks selection 520 displays similar information as selection 514, but with the information orientated to display processes associated with each risk, rather than the risks associated with each business process. Risk selection 520 also displays controls associated with each risk, similar to selection 516, but with the information orientated as controls associated with each risk, rather than the controls associated with each business process. Risks selection 520 also includes a risks search page enabling users to search for risks by name, process type, risk category, impact category, line of business, financial statement, and financial item. Risk selection 520 also enables auditors to navigate a hierarchical tree to locate a specific risk. Risks selection 520 further enables auditors to add or delete risks.

Selection 522 displays the controls associated with business processes, similar to selection 516, but orientated to display the risk and/or business processes associated with each control. Selection 522 enables auditors to add or delete controls. Selection 522 also includes a control search function to search for controls by name, process type, risk category, impact category, line of business, financial statement, and financial item. Control selection 522 also enables auditors to navigate a hierarchical tree to locate a specific control.

Additionally, if the control is associated with a performance or control objective, auditors can view a list of the KPI that have been created for the organization. Similarly, if the control is a workflow definition controls, auditors can view business processes associated with the control. If the control type is a system option, auditors can view a list of profile options and system option for the workflow-enabled application running the process. If the control type is a manual control, the text of the manual control can be viewed by the auditor.

Control reports selection 524 enables auditors to review the control and performance objectives associated with a business process, and to add additional control and performance objectives in the form of KPI to business process, similar to selection 518. However, selection 525 orientates information to display the business processes associated with each control or performance objective, rather than the control and performance objectives associated with each business process.

Audit Tab 520 enables auditors to create the audit projects, to record the activities of the audit project as it executes, and finally to issue the audit opinion and audit summary report. When a specific audit project is undertaken, either as a scheduled activity or as the result of an trigger event, (such as a large accounts receivable right off), the audit project is created from an audit project template for the business flow being audited. For example, if the business flow being audited is Order to Cash, the order to cash audit project template is used. The tasks required to audit the process risks of the Order to Cash process are also in the audit project template. The reports that verify the controls are in place can be referred to from within the audit project template.

Once an audit project is initiated, auditors can locate available people with the skill set to match the assignment. Once underway, audit projects can be monitored for progress against project milestones. Under the Audit tab 526, auditors can perform functions related to performing and recording their work, such as record audit issues, assigning follow up actions, attaching supporting documentation, and conducting threaded discussions. Additional specialized reporting is provided either on request or distributed through audit participants to both issue the audit opinion on completion or issue the audit summary report.

Audit tab 526 also provides auditors with specialized computer-aided audit tools including: Ratio Calculators, Anomaly Detectors, Sampling Tools, Legal Compliance Check Reports, Contract Contingency Check Reports, Process Control Reports, and Fraud Detectors.

The audit tab 526 also provides questionnaires to confirm an enterprise's contingency planning for continuance of operations. These questionnaires can be distributed via the notification system. Additionally, the audit tab 526 enables auditor to conduct information technology (IT) audits using specialized questionnaires and reports supplied for this purpose. These IT-specific features include reports for checking database security, function security, network security, physical access security, applications configurations, and applications configuration change history.

Management tab 532 enables managers of the audit department to create audit project templates and associate audit project templates with business processes. The audit templates are used as the standard workplan when auditing the associated business process. The management tab 532 also includes staff planning capability and skills management capability to help audit department managers ensure they have the right number of competent auditors to ensure the processes are in control.

Set up tab 538 enables auditors and audit department managers to perform the administrative functions such as assigning the audit schedules to organizations or business processes, defining segregations of duties, and recording incompatible functions. Audit can be scheduled on an organizational basis. For example, you may choose to audit the accounts receivable department every six months.

Segregation of duties is implemented to prevent employee malfeasance. Set up tab 538 allows auditors to define pairings of specific functions within one or more business processes that must not be available to the same user. In an embodiment of the invention integrated with a set of workflow-enabled application, the workflow-enabled applications automatically record the identity of the user performing each function in a business process. This is compared with the pairings of segregated functions defined by the auditors to ensure segregation of duties.

Similarly, set up tab 538 enables auditors to record a set of prohibited functions for each function in a business process. For example, a user having access to a create accounts payable invoice should not also have access to functions to create suppliers and enter purchase orders. Otherwise, there is a risk that the user can create fictitious suppliers and have the enterprise disperse funds to them.

Figure 6:
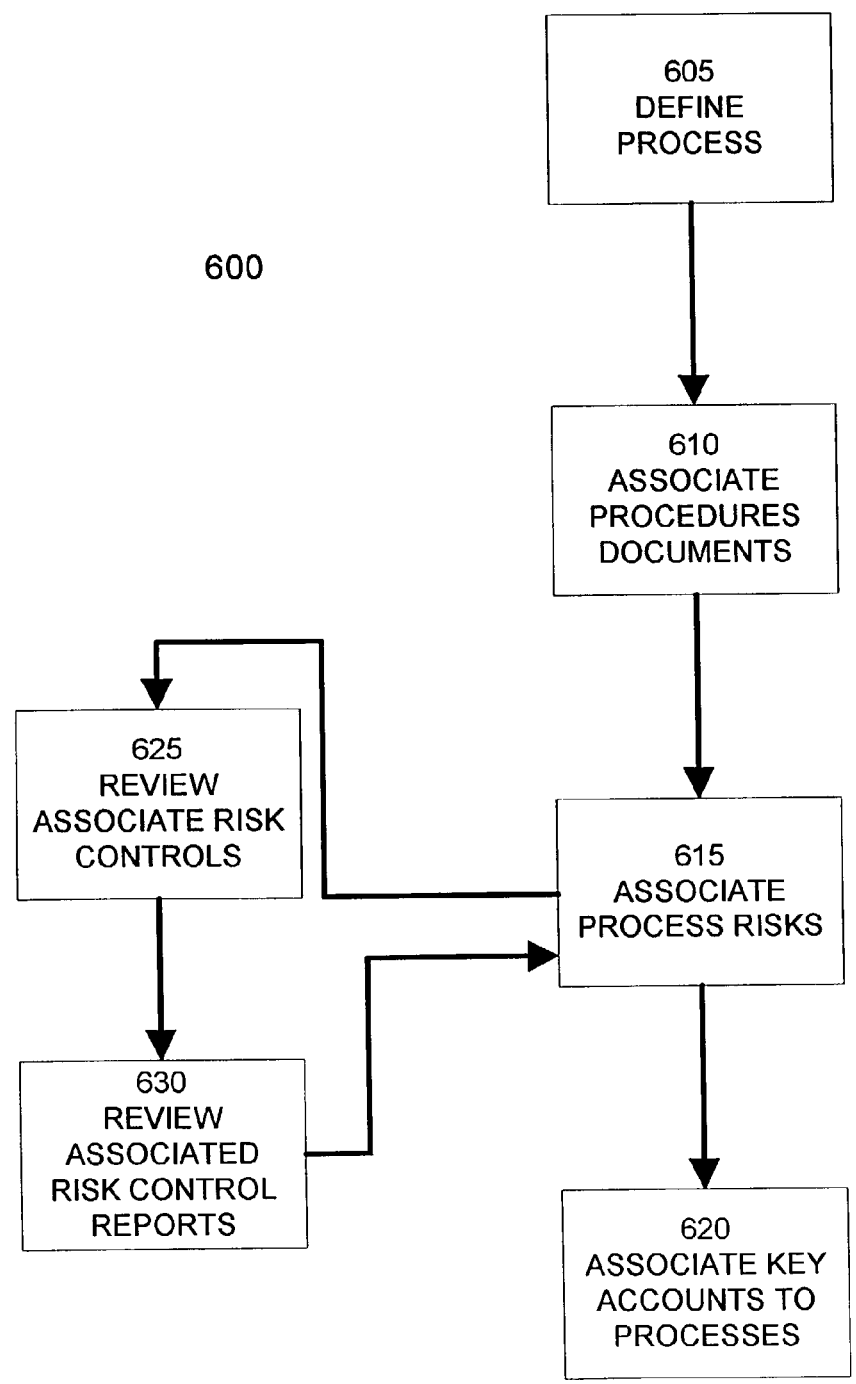
FIG. 6 is a block diagram of a method for creating a business process according to an embodiment of the invention.

FIG. 6 is a block diagram of a method 600 for creating a business process according to an embodiment of the invention. At step 605, a business process is defined. A business process can be defined from scratch using a workflow system, or by selecting a predefined business process from the business process library. A predefined business process from the business process library can also be modified to create a business process tailored to a specific purpose within an enterprise.

At step 610, procedure documents are associated with the business process defined in step 605. The procedure documents provide documentation for auditing the business process. In an embodiment, predefined procedure documents are associated with a predefined business process in the business process library. As business processes are selected from the library and configured for use in the enterprise, the associated procedure documents are also selected and designated for use during audits of the business process. In a further embodiment, a predefined procedure document can be modified to create a procedure tailored to a specific need within the enterprise.

At step 615, process risks are associated with the business process. Process risks can be selected from a predefined set of risks associated with a business process in the business process library. In an embodiment, process risks can be automatically associated with a business process based upon the organization using the business process. In a further embodiment, auditors can associate additional risks, either predefined or newly created, with the business process.

At step 620, key accounts are associated with the business process. Key accounts are financial accounts impacted by the business process and its associated risks. In an embodiment, the association of key accounts with a business process is used to create impacted financial statements, discussed elsewhere in this application.

Step 625 determines the risk controls associated with the business process. In an embodiment, the set of risks associated with the business process in step 615 determines a corresponding set of risk controls in step 625. In this embodiment, a set of predefined risks is associated with a corresponding set of predefined controls intended to mitigate these risks. In step 625, an auditor can review the controls associated with the business process. An auditor can add, remove, or modify the controls as he or she sees fit to tailor the controls to the needs of the enterprise.

Similarly, step 630 determines the risk control reports associated with the risk controls. Control reports, as discussed above, enable auditors to review the control and performance objectives associated with a business process, and to add additional control and performance objectives in the form of KPI to business process. In step 630, auditors can review the control reports associated with the business process, and can add, remove, or modify the control reports as he or she sees fit to tailor the control reports to the needs and process objectives of the enterprise.

Figure 7:
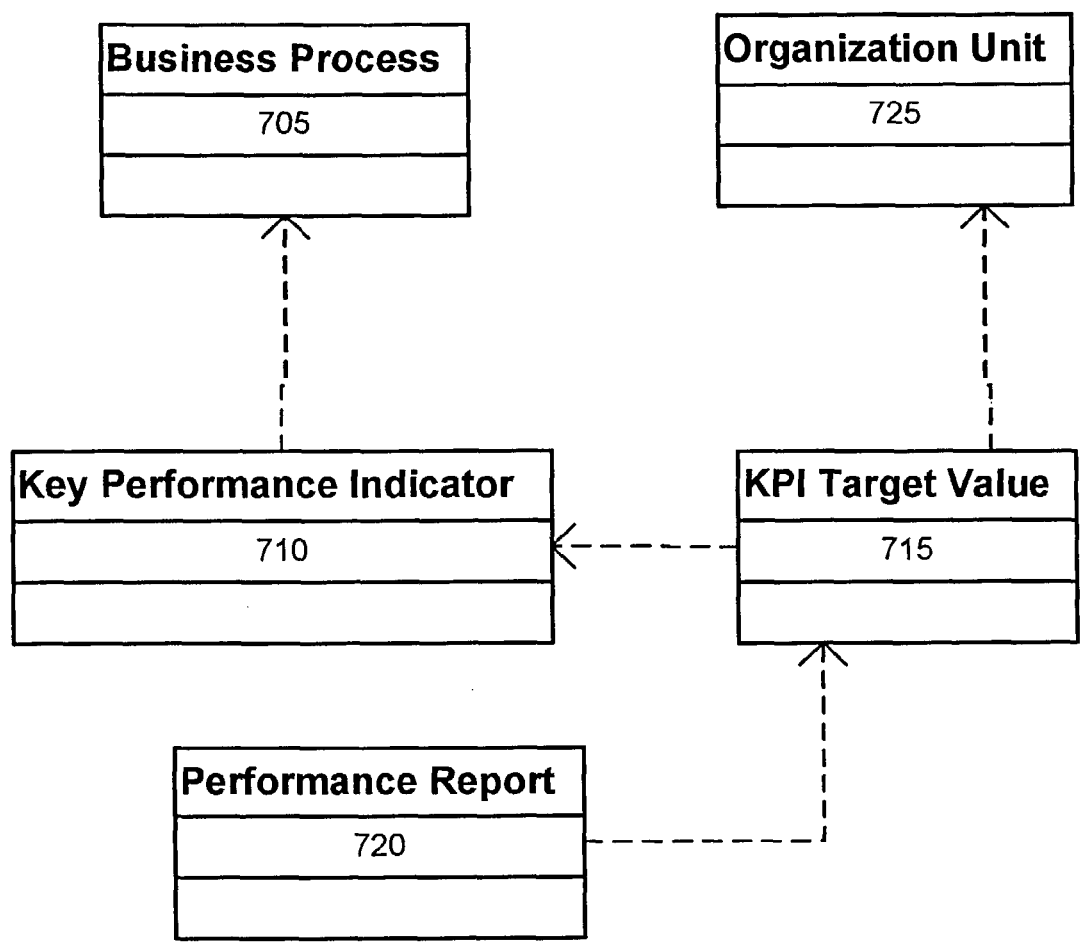
FIG. 7 is a block diagram of a portion of an embodiment of the invention for monitoring the performance of a business process.

FIG. 7 is a block diagram 700 of a portion of an embodiment of the invention for monitoring the performance of a business process. A business process 705 is associated with a key performance indicator 710. The key performance indicator determines a quantitative value representing the performance of the business process. For example, a key performance indicator 710 can be the average time to ship a product, the amount of accounts receivable pass due, or any other attribute derived from a business process.

The value of the key performance indicator is compared with a KPI target value 715. A result of this comparison is used to create a performance report 720 describing the business process's 705 performance in comparison to its objectives. The KPI target value 715 can be derived from a performance objective defined by the organizational unit 725 implementing the business process, or alternatively as discussed above, set by an auditor from the audit manager.

In an embodiment, the key performance indicator 710 is determined by a performance management framework application. The value of the key performance indicator 710 is determined as frequently as needed. Embodiments of the invention determine the key performance indicator's 710 value on a continuous basis, while alternate embodiments determine this value at other time intervals, such as daily, weekly, monthly, quarterly, and/or yearly.

Figure 8:
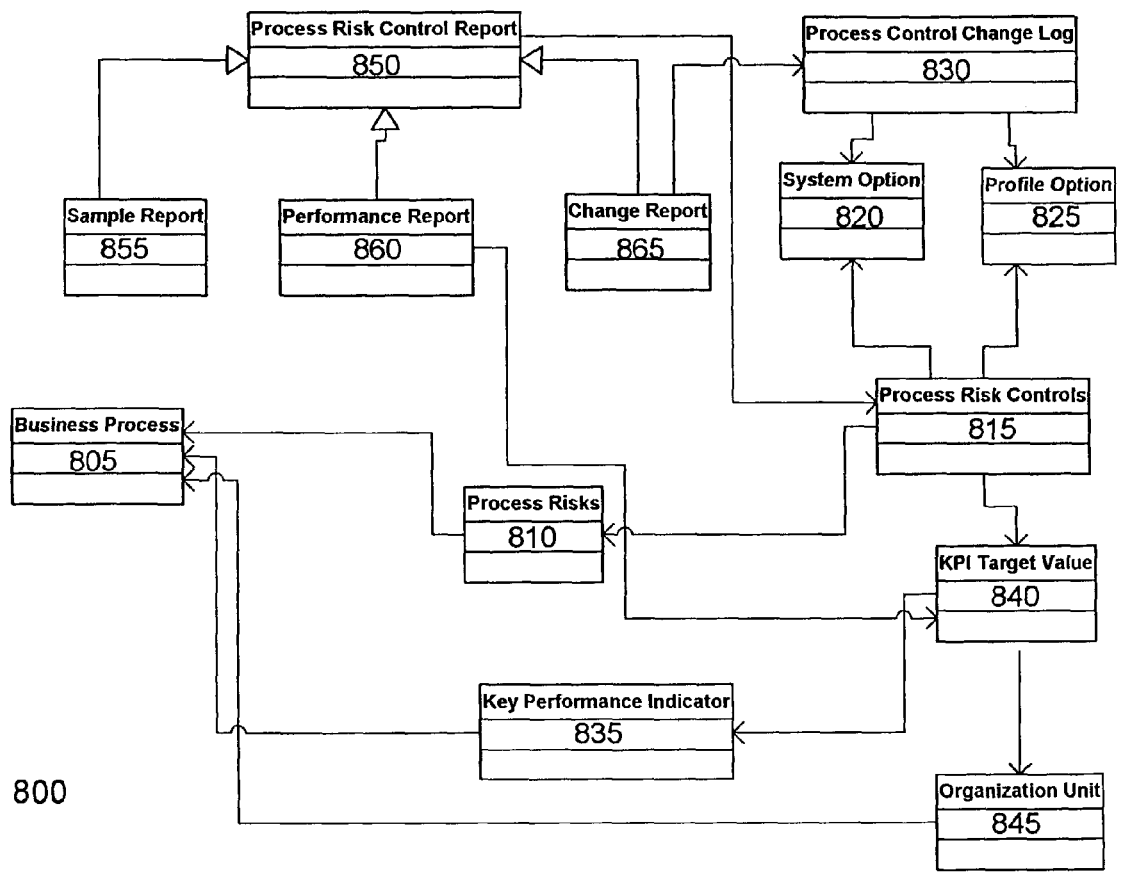
FIG. 8 is a block diagram illustrating the association of a business process with process risks, controls, and control reports according to an embodiment of the invention.

FIG. 8 is a block diagram 800 illustrating the association of a business process with process risks, controls, and control reports according to an embodiment of the invention. Business process 805 is associated with key performance indicators 835, KPI target values 840, and an organizational unit 845 in a manner similar to that described above with regard to FIG. 7. Business process 805 is additionally directly associated with organizational unit 845, so that auditors can view all of the business processes associated with an organizational units, or all of the organizational units associated with a business process.

Business process 805 is associated with process risks 810. The process risks 810 are associated with process risk controls 815 used to mitigate the process risks 810. Process risk controls 815 are associated with the KPI target value 840 to enable comparison of a process risk control's KPI values with their corresponding KPI target values 840.

Process risk controls 815 are further associated with system options 820 and profile options 825. As discussed above, one type of process risk controls can be implemented using the profiles and configurations of one or more workflow-enabled applications. The system options 820 and profile options 825 are associated with the process control change log 830, which records the change in the process risk controls 815 over time.

Process risk controls 815 are also associated with the process risk control report 850. The process risk control report 850 creates summaries and reports of the process risk controls, enabling auditors and managers to monitor the performance of process risk controls. The process risk control report 850 employs a sample report 855 as a template for creating reports. The process risk control report 850 can create performance reports 860 summarizing the performance of a process risk control relative to a KPI Target value 840. Additionally, the process risk control report 850, in conjunction with the process control change log 830, can create a change report 865 summarizing the changes to the process risk controls 815 over time.

A great deal of the time and effort in an audit is spent verifying the business processes that an enterprise is using. Enterprises often have a global or standard business process. For example, there may be a standard business process for running an Order Desk. Auditors can authorize the standard process as the standard way of running Order Desk operations for all companies in the enterprise. However, a given company or organization unit within the enterprise may be running a derivative or variation of the standard process. Deviations from the approved standard process may be justified in terms of local legal framework or customs. For example, some countries mandate the number of digits in a journal numbering scheme.

When the derivative process is audited, the auditors must determine whether the derivative process introduces any additional risks. Any additional risks must be evaluated by auditors and/managers. If the risks of the derivative process are acceptable, then the derivative process is approved. Depending on the nature of the risks introduced by a derivative process, approval may be required from one or more auditors or managers.

The audit manager enables enterprises to formalize the approval of business processes and their derivatives. The workflow system acts as a repository of all of the business processes of the enterprise. In an embodiment employing workflow-enabled applications to implement the business processes, derivative processes are automatically added to the workflow system as organizational units change their operations. In an alternate embodiment, organizational units provide the workflow system with descriptions of their business processes manually. The workflow system associates derivative business processes with their implementing organizational units.

The audit manager compares the business processes of an organizational unit with the standard global business process already approved by the enterprise to identify deviations from the standard business process. Auditors can view each deviation and its approval status (e.g. approved, unapproved, or approval in progress), issue approval requests to the appropriate auditors and managers through the notification system, and monitor any follow up discussions or actions undertaken in either approving the derivative process or bringing the derivative process back in line with the approved global process. Once a derivative process has been approved, it is added to the repository of approved business processes and will be available to auditor in future audit cycles. Additionally, the approvals, justifications, and discussions related to process deviations are also included as a record of the approval of the derivative process.

Figure 9:
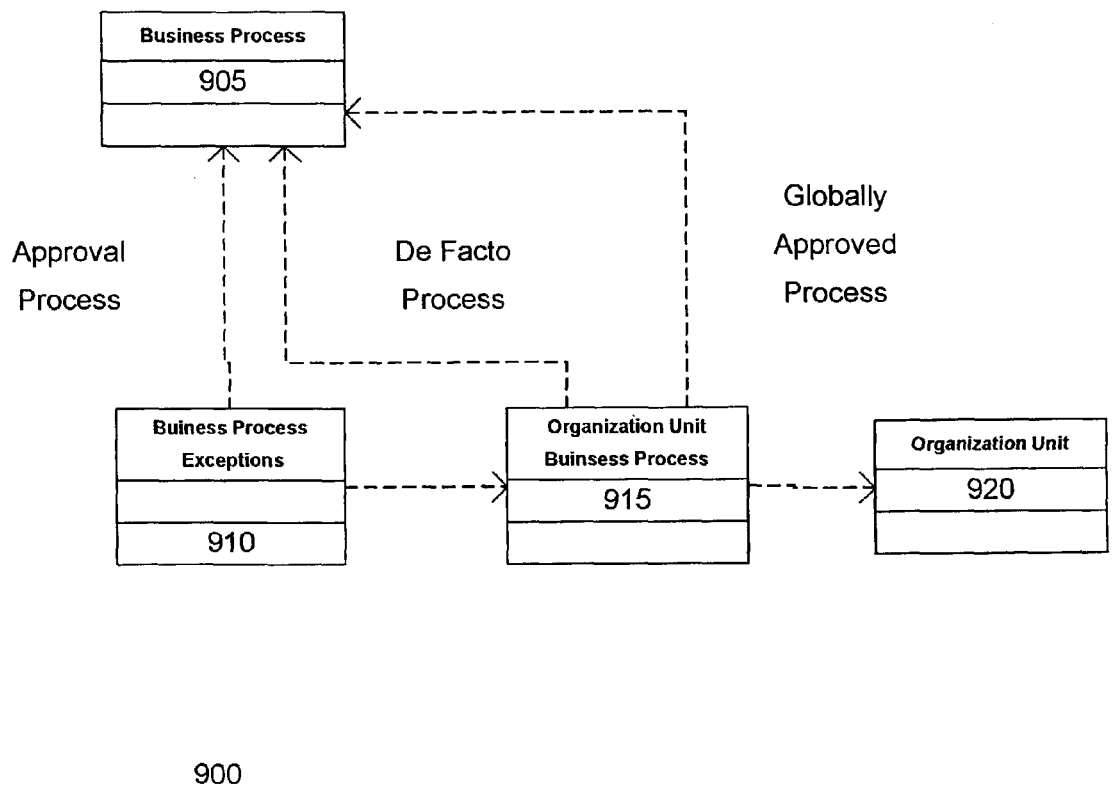
FIG. 9 is a block diagram of a portion of an embodiment of the invention for approving a variation of a business process.

FIG. 9 is a block diagram 900 of a portion of an embodiment of the invention for approving a variation of a business process. The de facto business process 905 is compared with the organizational business process 915. The organizational business process 915 inherits the global approved business process and any changes associated with the organizational unit's business processes from the organizational unit 920. Any deviations from the approved business process are identified and subject to an approval process. As deviations are accepted as business process exceptions 910. Additionally, users can request approval for changes to the standard business process.

In response to the initiation of an approval process, either arising from a user request or from the identification of a deviation in the de facto business process, the business process change monitor notifies one or more responsible users associated with the business process. The notification identifies the deviation (or requested deviation). Responsible users can include managers, auditors, and attorneys, who are responsible for determining whether the deviation is acceptable from business, financial, and legal perspectives. Each notified user can approve or disapprove of the deviation. The approval decision and any comments from each notified user are shared with the other users. Notified users can discuss the deviation using the notification system, such as the threaded discussion capability, until a consensus is reached. Based on the decision, the deviation can be approved and implemented, or disapproved and removed. The record of the approval process is preserved to document the changes to the business process.

Figure 10:
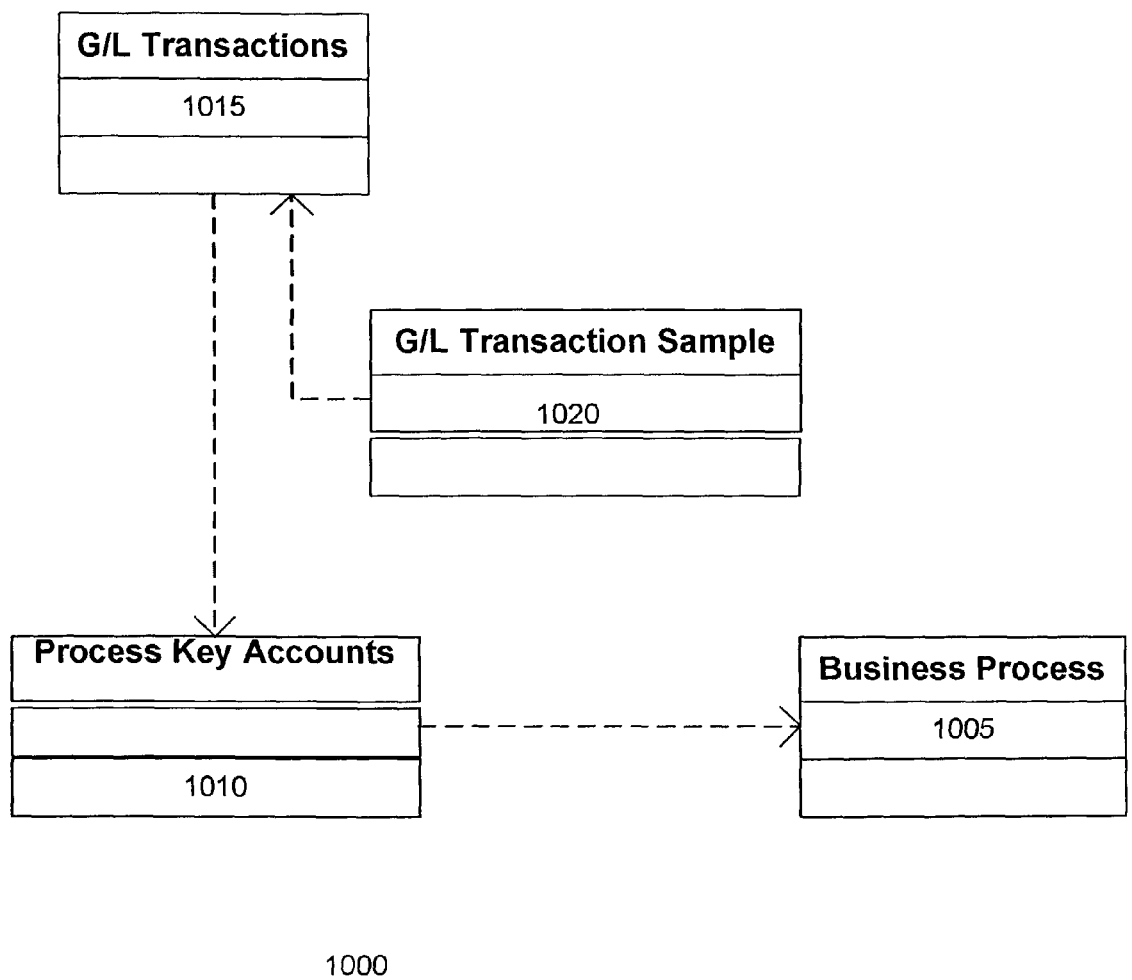
FIG. 10 is a block diagram of a portion of an embodiment of the invention for creating an impacted financial statement.

FIG. 10 is a block diagram 1000 of the association of a business process with a financial account for creating an impacted financial statement and auditing sample transactions in an embodiment of the invention A business process 1005 is associated with one or more key financial accounts 1010. The financial accounts 1010 are associated with a set of general ledger transactions 1015 that impact the financial accounts 1010. Auditors can select general ledger transaction samples 1020 for further scrutiny. In an embodiment of the invention, the association of the business process 1005 with key accounts 1010, general ledger transactions 1015, and general ledger transaction samples 1020 enable auditors to view sample transactions associated with a business process.

In addition to scrutinizing sample transactions, auditors can initiate testing steps to validate that a control is in place and is effective. A testing steps module of the audit manager enables auditors to define steps to validate controls. The steps can define a manual testing procedures, for example to test the physical security of an item, or to create one or more reports searching for suspicious behavior. For example, to detect risks associated with "quid pro quo" orders between an enterprise and a customer/supplier, a supplier audit report or a supplier/customer netting report, which identifies entities that are both customers and suppliers, can be created.

Additionally, a report can be created from one or more KPI monitored by the performance management framework. For example, a report can summarize purchases as a percentage of sales. Another type of report can monitor the change in profile or system options effecting the behavior of a business process. For example, a workflow-enabled accounts payable application can have options for activating or deactivating an audit trail, setting a default country, allowing folder customization, and enabling/disabling sequential numbering. Frequent changes in these options can indicate suspicious activity warranting further investigation.

Figure 11:
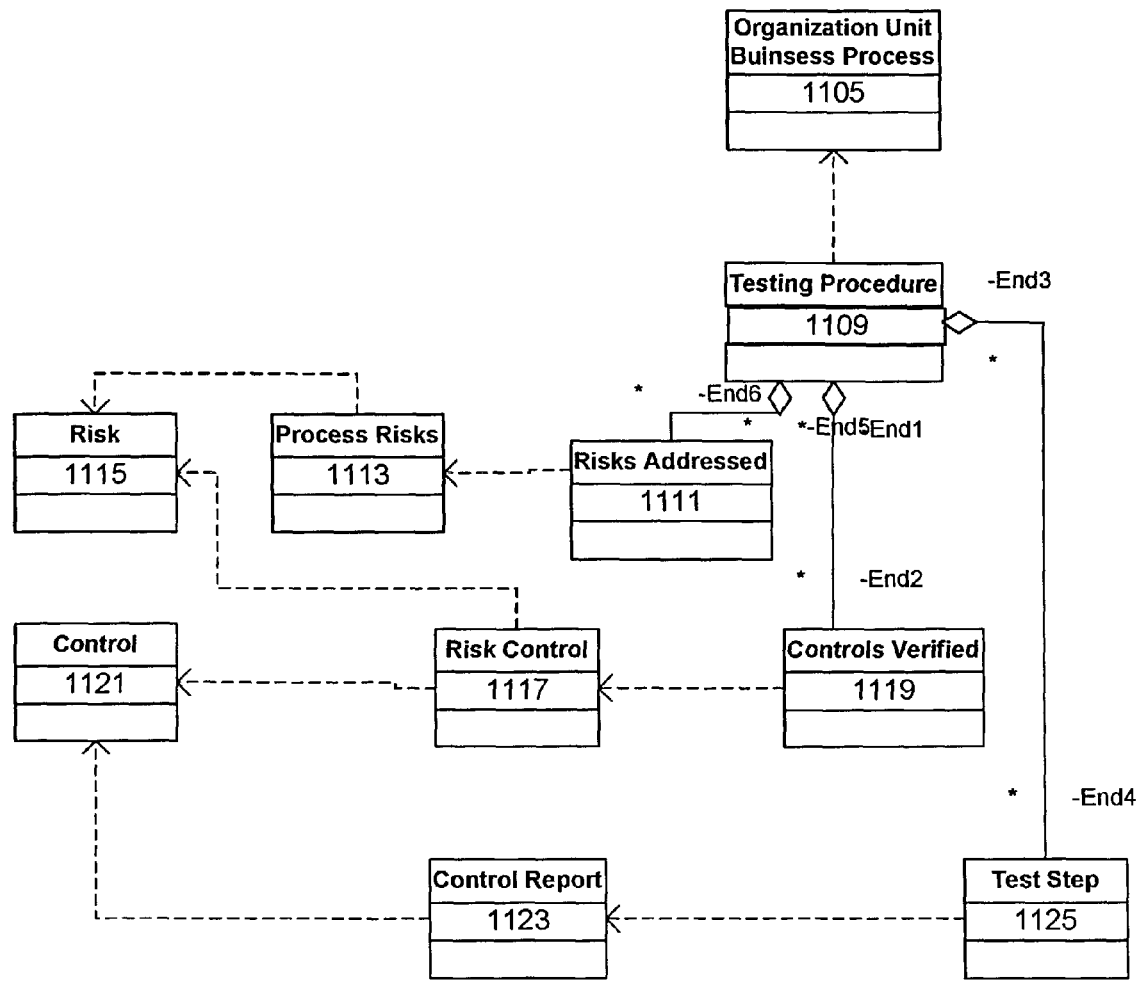
FIG. 11 is a block diagram illustrating a set of data objects used by an embodiment of the invention.

FIG. 11 illustrates a block diagram 1100 of the association of a set of testing steps with a business process. The organizational unit business process 1105 is associated with a testing procedure 1109. The testing procedure has several different testing paths used to validate the business process and its controls. First, the testing procedure is associated with a set of risks addressed 1111 by the business process. These general risks are further refined into a set of specific process risks 1113. Each process risks can be associated with one or more controls 1117.

In a second testing path, the testing procedure 1109 is associated with a set of controls verified 1119. The controls verified 1119 are the controls validated as adequate for the business process. The controls verified 1119 are derived from the set of risk controls 1117. Risk controls 1117 are associated with a risk 1115. Controls 1121 are associated with the risks 1115 to determine the set of risk controls 1117.

In a third testing path, the testing procedure 1109 is associated with one or more test steps 1125. Each test step is associated with one or more test control reports 1123 reporting the value of one or more KPI associated with a control 1121.

Another aspect of the invention is a hosted audit service. Although the audit manager is ideally tailored for integration with a workflow system and a set of workflow-enabled applications, some enterprises do not have this degree of application integration. Other enterprises may be using incompatible workflow applications.

Figure 12:
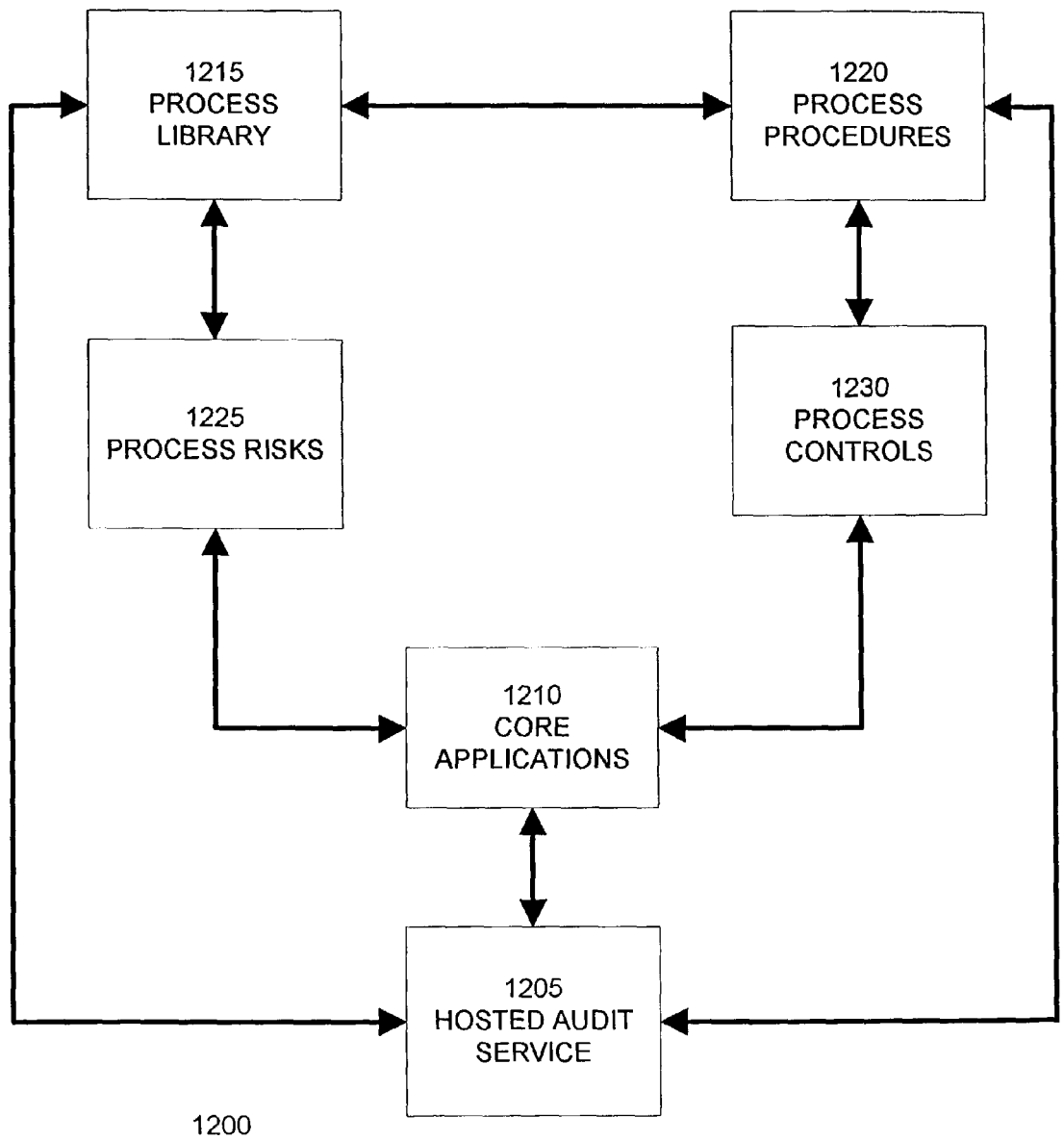
FIG. 12 illustrates a block diagram of a hosted audit service according to an embodiment of the invention.

To address the audit needs of these enterprises, a hosted audit service leverages the process library and associated process procedures, risks, and controls to provide an audit "package" tailored to the needs of the enterprise. FIG. 12 illustrates a block diagram 1200 of a hosted audit service according to an embodiment of the invention. Auditors can access the hosted audit service 1205 to select business processes from the process library 1215 equivalent to the enterprise's business practices. Because the process library 1215 includes business processes based on standard business and industry practices, it is very likely some processes in the process library 1215 will closely resemble the enterprise's actual business practices.

Based on the auditor's selection of business processes, the hosted audit service 1205 creates an audit procedures manual from the set of process procedures 1220. As discussed above, the process procedure documents are associated with the appropriate business processes. The hosted audit service 1205 leverages this association to create an audit procedure manual tailored to the business practices of the enterprise. The enterprise's auditors can follow the audit procedures manual to audit the business practices of the enterprise.

Additionally, the set of business processes 1215 is associated with sets of process risks 1225 and process controls 1230. The hosted audit service 1205 can create a list of the associated risks and controls for the business processes selected by the auditor. Auditors can use this list of risks and controls to verify that their enterprise has adequate controls and that all possible risks are addressed.

Unlike some of the above-discussed embodiments of the audit manager, which actually implement business processes and associated controls in workflow-enabled applications, an embodiment of the hosted audit service does not execute business processes or controls. However, this embodiment of the hosted audit service does provide auditors with a custom-tailored audit "package" that can be manually implemented in their enterprise. This provides substantial time and cost savings for auditors as compared with having to develop their own audit procedures internally or with outside consultants.

Additionally, the hosted audit 1205 provides auditors with a central interface to all audit related tasks. In an embodiment, the hosted audit service 1205 provides a central interface similar to audit manager 305. The hosted audit service 1205 enables auditors to create and manage audit projects. This embodiment of the hosted audit service 1205 provides auditors with planning functions, task assignment functions, progress tracking functions, communication functions, and document management functions, similar to those described for audit manager 305. The hosted audit service 1205 can be used to schedule audits automatically.

The hosted audit service 1205 enables auditors to audit issues warranting further investigation, follow ups to audit issues, and resolutions of audit opinion differences. In a further embodiment, the hosted audit service 1205 includes a threaded discussion capability is used to resolve audit opinion differences. The notification system and its threaded discussion capabilities are also used by the hosted audit service to conduct management surveys and to enable anonymous "whistleblower" reporting. The hosted audit service 1205 can store and manage supporting documentation in a document management system and includes specialized computer-aided audit tools, such as Ratio Calculators, Anomaly Detectors, Sampling Methods, Process Controls Reports, and Fraud Detectors.

In a further embodiment of this aspect of the invention, the hosted audit service 1205 is provided to auditors via a web-browser interface. Auditors access the hosted audit service 1205 via a web browser to select business processes appropriate to their enterprise, to create and download an audit procedures manual based on the selected business processes, and to create and download a list of risks and controls. Additionally, the hosted audit service 1205 provides audits with a central interface to all audit related tasks similar to that in screen display 400 discussed above.

Although the invention has been discussed with respect to specific embodiments thereof, these embodiments are merely illustrative, and not restrictive, of the invention. For example, although the invention is discussed with reference to an audit manager application having numerous integrated modular functions, the invention can implement each of these functions in a separate or stand-alone form. Thus, the scope of the invention is to be determined solely by the claims.

What is claimed is:

1. A computer-readable storage medium having stored thereon program code executable by a computer system, the program code comprising:
   code that causes the computer system to import an XML file comprising financial data;
   code that causes the computer system to parse the XML file to identify one or more financial accounts;
   code that causes the computer system to match a financial account in the one or more financial accounts with financial information associated with a business process, wherein the business process is associated with a set of risks, and wherein the set of risks is associated with a set of risk controls; and
   code that causes the computer system to generate a financial statement for the financial account, wherein one or more financial statement lines in the financial statement are annotated with information identifying the business process, the set of risks, and the set of risk controls, thereby indicating that the one or more financial statement lines are impacted by the business process, the set of risks, and the set of risk controls.

2. The computer-readable storage medium of claim 1, wherein the XML file is encoded using XBRL standard taxonomy.

3. The computer-readable storage medium of claim 1, wherein the program code further comprises code that causes the computer system to parse the financial statement to identify a set of financial accounts associated with the financial statement and to match a set of business processes with the financial statement according to their associated financial accounts.

4. The computer-readable storage medium of claim 1, wherein the one or more financial statement lines are further annotated with information identifying a sample transaction in a set of sample transactions associated with the financial account, thereby indicating that the one or more financial statement lines are impacted by the sample transaction.

5. The computer-readable storage medium of claim 4, wherein the set of sample transactions are associated with the financial account via an association with the business process.

6. The computer-readable storage medium of claim 1, wherein generating the financial statement comprises creating a web page displaying the financial statement.

7. A method for displaying financial information, the method comprising:
- importing, by a computer system, an XML file comprising financial data;
- parsing, by the computer system, the XML file to identify one or more financial accounts;
- matching, by the computer system, a financial account in the one or more financial accounts with financial information associated with a business process, wherein the business process is associated with a set of risks, and wherein the set of risks is associated with a set of risk controls; and
- generating, by the computer system, a financial statement for the financial account, wherein one or more financial statement lines in the financial statement are annotated with information identifying the business process, the set of risks, and the set of risk controls, thereby indicating that the one or more financial statement lines are impacted by the business process, the set of risks, and the set of risk controls.

8. The method of claim 7, wherein the XML file is encoded using XBRL standard taxonomy.

9. The method of claim 7, further comprising:
- associating a set of sample transactions with the financial account, wherein the one or more financial statement lines are further annotated with information identifying a sample transaction in the set of sample transactions associated with the financial account, thereby indicating that the one or more financial statement lines are impacted by the sample transaction.

10. The method of claim 9, wherein the set of sample transactions are associated with the financial account via an association with the business process.

11. A computer system comprising:
- a processor configured to:
  - import an XML file comprising financial data;
  - parse the XML file to identify one or more financial accounts;
  - match a financial account in the one or more financial accounts with financial information associated with a business process, wherein the business process is associated with a set of risks, and wherein the set of risks is associated with a set of risk controls; and
  - generate a financial statement for the financial account, wherein one or more financial statement lines in the financial statement are annotated with information identifying the business process, the set of risks, and the set of risk controls, thereby indicating that the one or more financial statement lines are impacted by the business process, the set of risks, and the set of risk controls.

* * * * *

UNITED STATES PATENT AND TRADEMARK OFFICE
CERTIFICATE OF CORRECTION

| | | |
|---|---|---|
| PATENT NO. | : 7,941,353 B2 | Page 1 of 2 |
| APPLICATION NO. | : 10/464055 | |
| DATED | : May 10, 2011 | |
| INVENTOR(S) | : King et al. | |

It is certified that error appears in the above-identified patent and that said Letters Patent is hereby corrected as shown below:

On page 2, in column 2, under "Other Publications", line 3, delete "Dessertation" and insert -- Dissertation --, therefor.

On page 2, in column 2, under "Other Publications", line 4, delete "Learnng" and insert -- Learning --, therefor.

On page 2, in column 2, under "Other Publications", line 5, delete "ncome Txaes)," and insert -- Income Taxes), --, therefor.

On page 2, in column 2, under "Other Publications", line 28, after "Action" insert -- for --.

On sheet 9 of 12, in figure 9, Ref. Numeral 910, line 1, delete "Buiness" and insert -- Business --, therefor.

On sheet 9 of 12, in figure 9, Ref. Numeral 915, line 2, delete "Buinsess" and insert -- Business --, therefor.

On sheet 11 of 12, in figure 11, Ref. Numeral 1105, line 2, delete "Buinsess" and insert -- Business --, therefor.

In column 11, line 8, delete "PFM" and insert -- PMF --, therefor.

In column 11, line 19, delete "PFM" and insert -- PMF --, therefor.

In column 11, line 24, delete "PFM" and insert -- PMF --, therefor.

In column 11, line 33, delete "PFM" and insert -- PMF --, therefor.

In column 16, line 19, delete "invention" and insert -- invention. --, therefor.

Signed and Sealed this
Eleventh Day of October, 2011

David J. Kappos
*Director of the United States Patent and Trademark Office*

In column 16, line 26, delete "1015,and" and insert -- 1015, and --, therefor.